(12) United States Patent
Sosnovsky et al.

(10) Patent No.: US 7,559,065 B1
(45) Date of Patent: Jul. 7, 2009

(54) METHODS AND APPARATUS PROVIDING AN EVENT SERVICE INFRASTRUCTURE

(75) Inventors: Stanislav Sosnovsky, Upton, MA (US); Ruben Michel, Hopkinton, MA (US); Ilya Liubovich, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 709 days.

(21) Appl. No.: 10/750,227

(22) Filed: Dec. 31, 2003

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/318; 719/320
(58) Field of Classification Search .................. 719/318, 719/320
See application file for complete search history.

(56) References Cited

U.S. PATENT DOCUMENTS 6,718,371 B1 * 4/2004 Lowry et al. ................ 709/213
2004/0250254 A1 * 12/2004 Frank et al. ................. 719/310

OTHER PUBLICATIONS

Silberschatz et al., "Applied Operating System Concepts," First Edition, John Wiley & Sons, Inc., 2000; pp. 19-25, 53-56, 87-95, 135-139, 184-190, 255-265, 402-419, 515-519, 638-646, 725-735.*

* cited by examiner

*Primary Examiner*—Meng-Ai An
*Assistant Examiner*—Nathan Price
(74) *Attorney, Agent, or Firm*—Chapin IP Law, LLC

(57) ABSTRACT

In a conventional managed information environment network, event notification mechanisms typically monitor the various nodes and interconnections in the network. In particular configurations of the invention, an event service infrastructure allows an event, or class definition, to define the event and related event data. Invocation of the event includes only the event specific class definition. The infrastructure transparently processes the subsequent reporting and invocation of the appropriate event handler. The event handler, corresponding to the event definition, performs remedial and responsive processing of the event. A developer need only develop entities to subscribe to an event to identify the appropriate handler, and publish the event with any related event data upon detection. Each particular event avoids extraneous event definitions and associated files, thereby relieving the developer from unrelated events and allowing focus on the pertinent events. A detecting software entity initiates event handling by publishing the event, upon which the event service identifies and invokes each subscriber entity for performing the event handler associated with the event.

46 Claims, 12 Drawing Sheets

METHODS AND APPARATUS PROVIDING AN EVENT SERVICE INFRASTRUCTURE

BACKGROUND OF THE INVENTION

In a typical conventional managed information environment, such as a storage area network (SAN) operable to coordinate access to mass storage devices by a set of users, the storage area network provides an interconnection of a plurality of storage device nodes using associated interconnection nodes for access by a set of host computer systems. More specifically, the storage area network includes a variety of nodes for providing mass storage retrieval services to users, such as storage devices (e.g. disc drive arrays), connectivity devices (e.g. switches and routers), and conventional host computers. The host computers may execute software components called agents for monitoring and controlling the nodes and other manageable entities in the storage area network. A dedicated host computer system executes a management application that can communicate with the agents on other host computer systems to monitor and control (i.e., manage) that various components in the storage area network. The resultant infrastructure, therefore, for monitoring and controlling the storage area network, defines a complex array of nodes and interconnections.

Management of the storage area network infrastructure is a formidable endeavor. The multitude of nodes and interconnections between the various nodes present a substantial monitoring and control task for tracking throughput and performance, identifying bottlenecks, and pinpointing failures, for example. In a typical conventional managed information services network, a network management application, such as a Simple Network Management Protocol (SNMP) based application, for example, assists operators and users in gathering feedback from the managed entities in the network and performs diagnostic activities for isolating problem areas. Such management applications can also perform remedial action and improve efficiency of the conventional network infrastructure.

Complex software systems such as the managed information network (e.g., a SAN) often employ a software-based event mechanism in order to notify interested parties of significant events, such as the discovery of new servers, switches, or disk arrays, or the detection of failures, such as faulty drives, dysfunctional power supplies, or poor network connections, for example. In conventional software system implementation languages, such as the C++ programming language, for example, predefined standard event notification mechanisms are not be available and developers must create software routines to handle event management. In such a managed information environment, conventional notification mechanisms inform applications and other managing entities of various occurrences detected by deployed entities in the environment. Often, such notifications take the form of events, or alerts, which a detecting entity reports to a monitoring or responsible entity. The notification mechanisms typically strive to organize and propagate the alerts in a systematic manner according to a predetermined protocol. The predetermined protocol provides assurances that information in the alerts and corresponding responsive action occurs in a timely and/or effective manner to maintain the conventional managed information environment near peak efficiency.

SUMMARY

In a conventional managed information environment network, conventional notification mechanisms that gather and propagate information pertaining to the interconnected manageable entities for ensuring prompt and efficient remedial and/or responsive action to various occurrences in the network environment suffer from a variety of deficiencies.

In particular, occurrences typically take the form of events or alerts, in which the conventional notification mechanism propagates the event from a detector entity of the event to a responsive entity operable to interpret and correct, report, or remedy the condition or occurrence specified by the event. The event detector reports the event to a responsive entity according to a predetermined protocol of event reporting provided by the notification mechanism. In a large managed information environment, the breadth of potential events can be substantial. Further, each event may have a set of event data parameters describing particular details or variables of the event. For example, a mass storage device (i.e. disk) overflow warning event may include the volume of the disk, the storage area consumed, and the remaining area available.

A potential drawback of conventional implementation platforms, such as the C++ programming language, for example, is that they lack a standard event notification mechanism. In a conventional managed information environment, the conventional notification mechanism takes the form of an event reporter operable to gather events and transport event information to responsible entities for appropriate handling. The conventional event reporter defines an event base which may include event definitions, sets of classes, related interfaces, supporting files or entities, and communication paths for propagating the event information. Such a system identifies events, captures event data, propagates the captured data by transmitting the event data to pertinent, interested entities, and triggers handling of the event and event data at the pertinent entities, such as software components. The resultant conventional event reporter, therefore, defines a complex aggregation implementing a predetermined event reporting and handling protocol.

In a large conventional managed environment, development efforts often consume substantial time and effort for coordinating the conventional event service throughout the application under development. Adherence to the predetermined protocol encounters consistency issues, staffing education issues, and deployment issues, as such an effort typically involves many engineers of various experience levels. Novice developers may be unfamiliar with the conventional event service, and therefore find the conventional event service cumbersome to implement. Multiple, complex definitions of events and related data increase ramp-up time for new developers, and tend to complicate deployment by incorporating many definitions and related entities in the software build process. For example, a particular developer may require only reporting or processing of a single event, yet must inherit event definitions and classes (i.e. include files) corresponding to a much larger scope of potential events.

Furthermore, conventional software systems that process event data between different software components require that both the detector and receiver software components be resident and executing in order to exchange event information. As an example, consider a conventional software development environment based on the Common Object Request Broker Architecture (CORBA). Generally, according to the system of the present invention, a CORBA based implementation enables an underlying software process called a component server that provides software components developed for programmer access to various services for standardized manipulation and access to object data to be shared between components. If two conventionally developed software components are to execute and exchange event information in a conventional CORBA software development and execution environment, the software developers of such conventional components must develop, from scratch, event management software to coordinate the exchange of event information.

This task of custom developing (i.e., coding) software to manage the exchange of event information can become a significant burden on component developers and can distract their attention from focusing on development of the primary functionality of the software component they are creating. For two conventional CORBA components to exchange event information, it is a requirement that each must be executing at the time of event detection and propagation of event information from one component to another. In one conventional scenario, the component developers can assume that both components will be executing in the CORBA environment during event detection and propagation. This is hazardous assumption however since if one component were to unexpectedly fail (e.g., the event acceptor crashed or hangs), the other component (e.g., the event detector) may also hang or delay as a result of not being able to propagate the event to the event acceptor component, thus creating execution problems. To overcome such problems in conventional systems requires that the developers of such conventional components custom design, write, and test software code to perform the event exchange between components while accounting for error conditions such as hung or crashed components.

Conventional CORBA (or similar) software development platforms do not provide a transparent, seamless, activation mechanism within an event service that allows one component to create an event for receipt by another component that is not currently loaded in memory and executing. Such Corba activation mechanisms generally benefit from extensive developer knowledge of the Corba object and the Corba activation mechanism. Therefore, developers of applications which employ the Corba activation mechanism are expected to be highly proficient in such Corba specifics, which is undesirable in a development framework aimed at relieving developers of the iintricies or Corba internals. Accordingly, all event exchange software must be custom developed and integrated by component developers into each component and each component that is to exchange event information must be loaded and executing in runtime for successful event exchange. This creates situations that require significant processing and memory resources in a computer system (e.g., a host) to maintain all of the components in a loaded and active state such that they are available for the exchange of event information between each other. This significantly hinders development of lightweight CORBA-based applications.

Accordingly, since conventional CORBA software development platforms do not provide a suitable event service for providing a seamless, transparent event handling framework, event handling is left up to component developers and is quite prone to human (i.e., software) error since each developer must entirely implement event management on their own within their component code. Also, exchange of event information between components in a conventional CORBA-based environment requires that each component be loaded and executing to properly exchange event data. Other conventional software development platforms such as Java 2 Platform Enterprise Edition (J2EE) manufactured by Sun Microsystems, Inc. of Palo Alto, Calif. or the Common Object Model (COM) manufactured by Microsoft, Inc. of Redmond Wash. suffer similar problems due to lack of a sufficiently embedded, transparent event service.

Embodiments of the invention are based, in part, on the observation that a conventional event reporting mechanism which requires inheritance of substantial unrelated classes of events tend to be cumbersome for developers, particularly novice developers, to implement, thus decreasing efficiency and driving up development and maintenance costs. It would be beneficial, therefore, to provide an event service infrastructure which includes only relevant events employed by the developer, therefore requiring consideration and manipulation of only the pertinent event definitions and code structures. It would be further beneficial to provide an event reporting mechanism which automatically correlates each event with the corresponding subscriber and handler upon reporting of the event by a detector of the event occurrence, thereby relieving an event handler of polling and/or casing the events to determine event handler invocation.

Furthermore, in software development and execution environments based on CORBA, COM or other such service-based systems, embodiments of the invention provide an event service that co-ordinates the exchange of event information between components or similar developer-created software modules. The event service of this invention does not require that components that create or receive event information be active (i.e., loaded and running) at the same time (though they may be). Rather, such components can operate asynchronously using the event service of this invention and thus a component can, for example, register for, or subscribe to, an event during runtime and that component can later become disabled (e.g., deactivated, execution halted and/or unloaded from memory). The event service that receives the event subscription can "remember" this event subscription and another component that later publishes or notifies the event service of occurrence of an event can cause the event service to correlate the subscription and publication for that event in order to notify the disabled component. This can include interoperating with the component server (i.e., the CORBA process that manages operation of components) to ensure that the disabled component (that formerly subscribed to the event but then became disabled) is re-enabled (i.e., is again incarnated and ethralized). Once enabled, the event service notifies the component that formerly subscribed to the event of the occurrence of the event. The event service of this invention thus does not require components that either subscribe to or publish events to be active or enabled at the same time. This can allow for creation of software applications that require a much smaller "footprint" in terms of memory and processing resource usage.

Embodiments of the invention further provide an event service that includes unique mechanisms to account for situations in which a component loaded in one memory area that, for example, subscribes to an event and then become disabled, is later loaded into a different memory area upon reactivation. In such situations, an event handler within that component may have a new memory address. As will be explained, the event service architecture of this invention accounts for such situations thus allowing the event service to identify the new location of the component (e.g., after being re-enabled and reloaded in a new memory area) and its constituent subscribers and event handlers.

In particular configurations of the invention, the event service infrastructure allows an event, or its class definition, to define the event and related event data. While coding the event, no base classes or member classes are required. Invocation of the event instance includes only the event specific class definition. The infrastructure transparently processes the subsequent publishing and invocation of the appropriate event handler within the subscriber. The event handler, corresponding to the event definition, performs remedial and responsive processing of the event. A developer need only develop entities to subscribe to an event to identify the appropriate handler, and publish the event, from the same or another module, with any related event data upon detection. Each particular event avoids extraneous event definitions and associated files, thereby relieving the developer from external classes of unrelated events and allowing focus on the pertinent event class. A detecting software entity initiates event handling by publishing the event, upon which the event service identifies and invokes each subscriber entity for performing the event handler associated with the event. Further, each event may have multiple subscribers, in the same or different processes. The event service coordinates event handler invocation by associating an event identifier with each event, which remains specific to the event.

The event identifier is a generic reference to the event class, which avoids triggering a need to globally inherit all events by a compilation entity, and the event service transports, using the event identifier, the proper event data from the event publisher to the subscriber having the associated event handler. Therefore, subscribers to the event may subscribe prior to publication of the event. Further, the event service identifies and coordinates multiple subscribers and publishers in separate processes, and selectively activates inactive modules of identified subscribers in response to a publication of an event. In this manner, the event service provides a seamless, transparent event subscription and handling mechanism employing only the event class on the user/developer side, avoiding extraneous definitions and minimizing execution footprint while still capturing and queuing published events on behalf of the subscribers.

Therefore, the system of the present invention provides the event service infrastructure with features including: an infrastructure that automatically enables (activates) a module (component) when an event is published to a subscriber within that component, in contrast to conventional support packages such as the Java 2 Platform Enterprise Edition (J2EE) or the Common Object Request Broker Architecture (CORBA) or COM. As briefly explained above, a component that is handling events can be disabled (passivated) on demand (e.g., if that component is not required but its memory may be useful for other components). In one embodiment, the event service delays passivation until all outstanding publications terminate, either by completing event handling or through cooperative thread cancellation. Each publishing entity, or component, can be passivated at any time without impacting event handling in other components, even in components residing in different executable entities (component server processes). This feature is accomplished by allocating each event instance and its reference counter in shared memory. Consequently, the event class need not provide a copy-constructor and assignment operator, and need not derive from component framework classes. Further, the event service may employ both shared memory and conventional CORBA calls for communicating among multiple component server processes. Such communication channels are therefore transparent to component developers. Additionally, unlike conventional packages, such as the CORBA Component Model (CCM), and the CORBA Event and Notification Services, for example, the system of the present invention avoids employing the Object Management Group Interface Definition Language (OMG/IDL), as is known to those of skill in the art. Therefore, the users (developers) need not rely on OMG IDL, and are free to use the C++ Standard Library in the event and subscriber class definitions.

In further detail, the system of the present invention provides a method for processing events in a managed information system infrastructure for receiving an event subscription containing an event identity for an event, in which the event corresponds to significant occurrences in the managed information system. The infrastructure event service associates the event identity with a subscriber including an event handler responsive to the event by creating a mapping of the event identity to the subscriber and event handler triggered by a dispatch command. The dispatch command includes a reference to the subscriber, and hence the appropriate handler, and also a reference to the associated event data, and enqueues a request to perform, or execute, the handler, via a thread, as discussed further below. During ongoing processing in the managed information system, the event service receives a publication of the event and traverses, in response to the publication, the previously created mapping of the event identity to an indication of the corresponding associated handler. The traversal is operable to enable the module including the handler if the module is disabled, due to periodic activation and deactivation of modules, at the time of publishing the event.

In further detail, the event service replicates the dispatch command multiple times for each subscriber to the same event. Each of the replicated dispatch commands references both a reference to the particular subscriber, which indicates the execution reference of the event handler, and a smart event point class reference to the event data, which transports the event data to each instantiation (i.e. dispatch invocation) of the event handler. The event data is deallocated only after each dispatch initiated invocation of all subscribers is complete. Hence the reference counted smart event pointer is decremented upon completion each dispatch invocation, and may be deallocated upon reaching zero.

The event service therefore determines if the particular module including the corresponding subscriber and event handler is enabled, and selectively enables the module, if the module including the corresponding subscriber and event handler is disabled, thereby enabling the subscriber and event handler for receipt and subsequent processing of the published event. Following such selective activation, if needed, the event service determines the mapping of the enabled module to the corresponding subscriber and event handler, and invokes the module including the corresponding subscriber and event handler via the mapping.

Upon successive publication, the event service further identifies, using the associated event identity, the particular handler corresponding to the subscribed event in the enabled module including the handler. The event service then invokes the event handler, via the corresponding subscriber, using the state (i.e. variables and/or attributes) of the subscriber. Such invocation includes, in particular exemplary arrangements, identifying the event in a persistent event mapping, in which the persistent event mapping is indicative of modules containing subscribers and event handlers associated with the event, and dispatching, in the identified modules, the associated subscriber and event handlers. Further, the publication of the event is operable to enable a plurality of subscribing software entities, in which each subscribing entity includes a particular responsive event handler for handling that event.

The dispatch mechanism selectively receives the enablement indication in response to traversing in the persistent event mapping, and identifies, in a local event mapping for the enabled module, subscriber entities including handlers associated with the mapped event. Employing the local mapping, dispatching invokes the identified subscribers including associated handlers in the mapped module.

The persistent mapping of the event is applicable to each module in the server, and is operable to maintain the event independently of individual modules referencing the event, in which the independent maintenance is operable to avoid the use of copy constructors of the event for enabling successive references to the same event. This persistent mapping is further operable to allow disabling a publishing component performing the publishing prior to invoking the module including the subscriber and event handler, and allows completion of the invocation of the corresponding handler while the publishing component remains disabled. Similarly, a subscribing software entity issuing the received event subscription may be disabled following the subscription until an occurrence and subsequent publication of the event.

The event service receiving the event publication according to a genericizing reference, and identifies an event specific class corresponding to the event. The event specific class is transparent to the mapping because of the genericizing reference, such as a void pointer type, however is nonetheless operative to distinguish the received events from other events according to the accompanying event ID.

In operation, the event service infrastructure is characterized by defining a plurality of events, in which each of the plurality of events is associated with a genericizing reference. The genericizing reference, therefore, may refer to any of the plurality of events, while each of the events is associated with an event specific class having event data indicative of event specific parameters. The event data includes event variables generated and passed by the publisher of the event and subscriber instantiated variables generated by the state information of the subscriber. Further, the common genericizing reference and associated event specific class may, in particular configurations, avoid event specific stubs and references related to the event specific class, which may tend to complicate deployment.

In the particular exemplary configuration described below, traversing the associations includes indexing, in the persistent mapping via the event identity, a persistent reference to the modules including the subscriber and event handlers associated with the event. The persistent reference in the persistent event map is operable to identify a handler corresponding to a module independently of enablement of the module containing the associated subscriber and event handler. Accordingly, associating the event identity by creating a mapping to the subscriber and event handler includes a local event map and a persistent event map. The event service first creates, via a component event service, a local mapping entry in the local event map having a reference to the subscriber entity including the corresponding event handler, and then creates the persistent mapping entry corresponding to the module including the corresponding subscriber and event handler, the persistent mapping entry operable to trigger selective enablement of the handling component by a plurality of subscribing entities. Such mapping may further include, therefore, identifying the persistent mapping entries corresponding to the published event, in which each of the mapping entries is indicative of a module, and identifying, via the local event map in the indicated modules, a plurality of subscribers including the corresponding event handlers in the identified modules associated with the event.

In the particular exemplary configuration, the system of the invention may be deployed in a language such as C++, in which enabling modules corresponds to activation of a corresponding component by an activation mechanism, and disabling corresponds to deactivation of the corresponding component by the activation mechanism. Such activation and deactivation operations are operable to reduce memory consumption by inactive components and provide selective invocation to maintain availability of the component. The enabling and disabling is performed at a level of granularity of the modules, in which each of the modules corresponding to a component and is operable to be enabled and disabled by activation and deactivation of the corresponding component.

Such a deployment associates the event identity with a subscriber and event handler in the native language of the event handler and corresponding subscriber (i.e. C++ or Java), and avoids a corresponding definition in an external interface language, in which the external interface language is employed to generate event specific code. A particular external interface language is the Object Management Group Interface Definition Language (OMG/IDL), which, while providing a robust interface for external entities and testing purposes, may compound complexity and contribute to undesirable overhead and footprint requirements.

The activation and deactivation operations further employ an activation manager for identifying, in a component server in communication with the shared memory portion, when to activate and deactivate components based on information in the persistent event map in the shared memory portion In alternate configurations, each of the modules is operable to include a plurality of threads, and a thread manager performs the operation of disabling to cooperatively terminate each of the threads prior to deactivation. Deactivation in this manner occurs by informing each of the threads of the termination and waiting until each thread has attained a termination point.

To allow on-demand component disablement (deactivation, or passivation), the component's threads support cooperative thread cancellation. Accordingly, the component framework creates an instance of the ACE_Thread_Manager class, discussed further below, in every component, as is known to those of skill in the art. This manager controls all non-ORB threads running within that component. The component framework provides two threading classes (Thread and Task) that seamlessly integrate the component's thread manager, responsive to the activation manager.

Particular configurations selectively generate the persistent event mapping via a strategized allocator if the association of the event identity occurs in a single module. Similarly, a smart event pointer class determines modules having handlers pending execution, in which publication further includes identifying a plurality of modules having either subscribers or publishers for a particular event. Publication further includes referencing, via a reference counting semaphore in the smart event pointer class, the instantiations of the event in each of the particular modules in which a subscriber or publisher exists. The smart event pointer is then employed to identify, via the reference counting semaphore, when instantiations of the event have completed execution corresponding to the event handler in each of the particular subscriber and modules. The smart event class pointer is then employed for deallocating the event from the shared memory when each module including instantiations of the event have identified completion of instructions corresponding to the event handler.

The invention as disclosed above is described as implemented on a computer having a processor, memory, and interface operable for performing the steps and methods for monitoring and processing events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
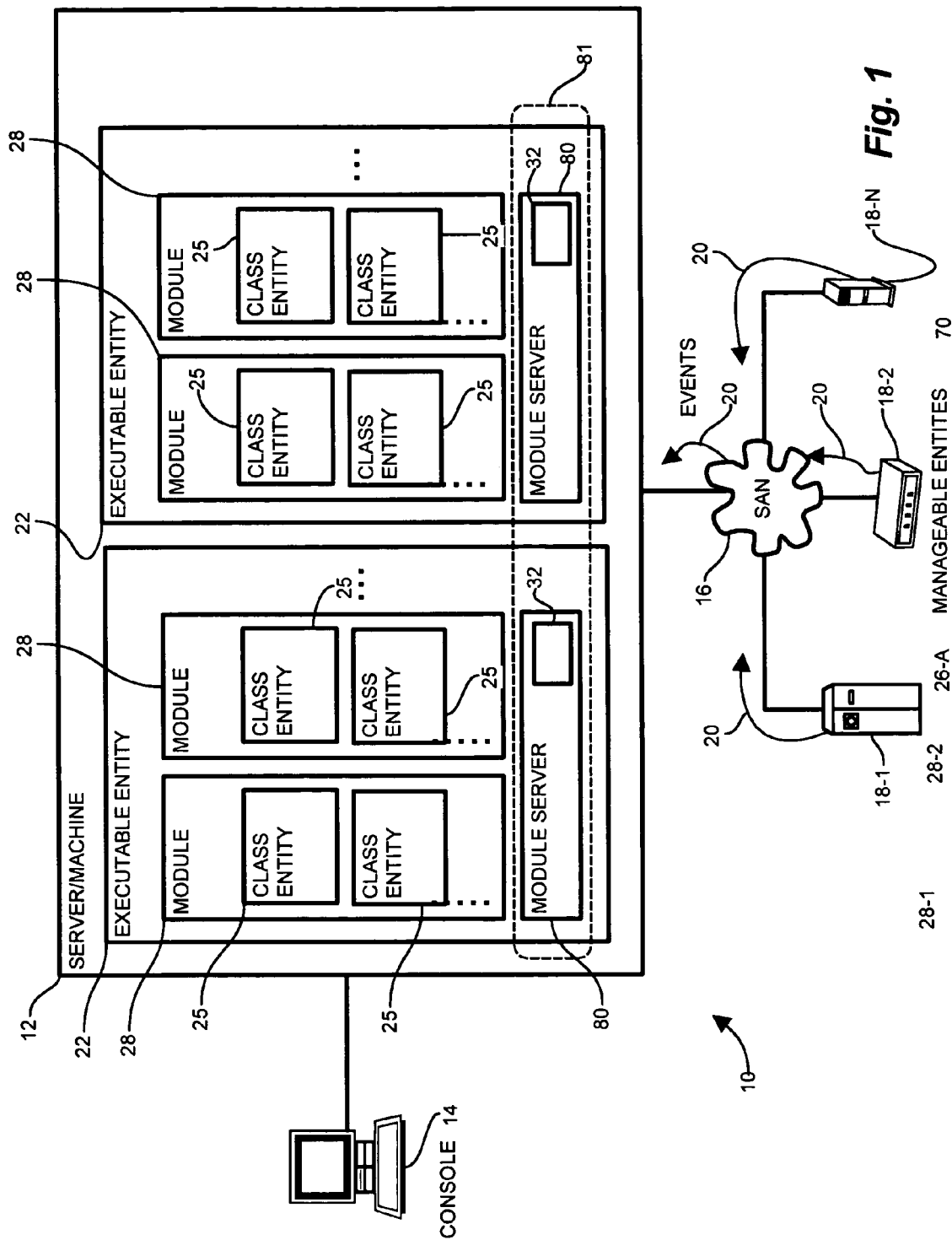
FIG. 1 is a context diagram of an exemplary managed information environment including a storage area network and suitable for use with the event service infrastructure of the present invention.

Particular configurations of the invention provide a method for an event service infrastructure which localizes the event service view to include only relevant events employed by each respective developer, therefore requiring consideration and manipulation of only the pertinent event definitions and structures for each developer. Configurations of the invention further provide a reporting mechanism which automatically correlates each event with the corresponding handler upon reporting of the event by the detector of the event occurrence, thereby relieving the event handler of polling and/or casing the events to determine event handler invocation.

In particular configurations of the invention, the event service infrastructure allows an event, or class definition, to define the event and related event data. Invocation of the event includes only the event specific class definition, in which the infrastructure transparently processes the reporting and invocation. An event handler, corresponding to the event definition, performs remedial and responsive processing of the event. A developer need only subscribe to an event to identify the appropriate handler, and publish the event with any related event data upon detection. Each particular event avoids extraneous event definitions and associated files, thereby relieving the developer of burdensome details associated with unrelated issues. A detecting software entity initiates event handling by publishing the event, upon which the event service identifies and invokes each subscriber entity for performing the event handler associated with the event. Further, each event may have multiple subscribers, in the same or different module servers (i.e. subscribers in different processes, each process having a particular module server).

The event service, therefore, coordinates event handler invocation by associating an event identifier with each event that remains specific to the event. The event identifier is a commonly typed reference to the event, which avoids triggering a need to globally inherit all events by a compilation entity, and the event service maps the event identifier to the proper event data in the associated event handler. Therefore, subscribers to the event may subscribe prior to publication of the event. Further, the event service identifies and coordinates multiple subscribers and publishers in separate processes, and selectively activates inactive subscribers in response to a publication of an event. In this manner, the event service provides a seamless, transparent event subscription and handling mechanism employing only the event class on the user/developer side, avoiding extraneous definitions and minimizing execution footprint while still capturing and queuing published events on behalf of the subscribers.

In the particular exemplary implementation illustrated in detail below, the event service infrastructure employs C++ and CORBA entities. The exemplary configuration provides complex software system developers with a user-friendly, resource-conserving, and strongly-typed event service. The user-friendliness of the event service stems from its minimal interface, consisting of several API calls: subscribe( ), unsubscribe( ), and publish( ). The resource-conserving nature of the event service stems from its full integration into the component framework, while imposing a limited overhead on framework resources. The strong typing of the event service stems from its ability to verify at compile-time that the subscribers' classes have appropriate event handlers.

The event service participants are events and subscribers (subscriber entities) to these events. The proposed event service decouples publishers (publisher entities) from subscribers, thereby reducing their static and run-time dependencies. Given an event class E, the subscription for event instances of that class proceeds as follows: The subscriber class defines a member function, employing C++ syntax, for handling such event instances: void handle_event(const E&). A subscriber instance is then passed as an argument to the subscribe( ) API call, notifying the event service that the subscriber instance is ready to handle the event through the aforementioned event handler. Note that multiple event handlers may be defined within a single subscriber class, thereby allowing a single subscriber instance to handle multiple event types.

An exemplary C++ type acting as an event is subject to the implementation details. All the data members of the event type that require allocation on the C++ Free Store should use a framework-provided C++ operator "new." In addition, the event type should not define any virtual member functions.

To publish an event, the event is created with the aforementioned operator new, and passed as an argument to the publish( ) API call. Contrary to conventional event service implementations, in which events are often instantiated before subscribing, in the system of the present invention, the subscription occurs through the event's type. Therefore, the creation of the event instance can be delayed until actual publication, thus conserving resources and reducing inadvertent complexity of the code.

FIG. 1 is a context diagram of a managed information environment suitable for use with the event service infrastructure of the present invention. Referring FIG. 1, the environment 10 includes a computer system server 12 in communication with a user console 14 and connected to a network 16 such as a storage area network (SAN). The network 16 interconnects a plurality of manageable entities (MEs)18-1 . . . 18-N (18 generally), such as mass storage devices, switching devices, and agents. Each of the manageable entities 18 is operable to send event messages 20 via the network to the server 12.

The server 12 is a microprocessor based computing device having a memory and interfaces (not specifically shown) and operable for communication with other such devices 12, 18, as is known to those of skill in the art. The server 12 is operable for performing executable entities 22, or processes, each containing one or more modules 28, or components. Each module 28 is operable to include a plurality of class entities 25, which are instantiations of classes defined by a software source code base (not specifically shown). The class entities 25, therefore, represent codified (i.e. coded) sets of attributes and methods (i.e. instructions), which the modules 28 inherit. Note that class entities 25 may inherit other class entities 25, therefore defining an inheritance hierarchy (not specifically shown) of the methods and attributes therein. The executable entities 22 include modules 28 according to performance and design considerations, and perform the methods using the attributes therein. Each executable entity 22 typically includes multiple modules 28 according to performance and design considerations of executable entity footprint (i.e. memory and processing demands) weighed with functionality and robustness of a particular executable entity 22 (process), such as the methods available to that executable entity. A module server 80 operates on a services layer 81 to provide process-level services common to all modules 28 in the executable entity 22, such as the event service 32 discussed further below. As an example, the module server 80 may be a CORBA component server and the services layer 81 may be a CORBA-based or similar software operation environment. As will be explained, the event service 32 of the invention resides, in this example embodiment, as an integrated event service 32 that operates in conjunction with (e.g., as an extension to) the module server 80 (e.g., a CORBA component server).

The class entities 25 in the infrastructure 10 include, in exemplary arrangements of the invention discussed below, subscribers entities, event handlers, and publishers (described further below) in addition to other class entities 25 for performing (executing) other operations in the scope of a particular executable entity 22. For purposes of this invention, the class entities 25 in the modules 28 represent those portions of this invention that are part of the code and/or data of each module 28 (i.e., within each component) used in conjunction with the event service 32, such as code to subscribe to, or publish, an event as well as local event mapping data (to be explained) that the event service 32 can access to invoke a proper event handler. A subscriber entity includes an event handler entity (discussed further below). In the infrastructure 10, developers select class entities 25 for inclusion in a module 28 for performing a particular task or operation. The developers then select modules 28 for inclusion in the executable entities 22 on the particular server 12, according to performance and throughput requirements, as discussed above. For example, failure or unexpected termination of a module 28 typically terminates the executable entity 22 in which it performs. Accordingly, it may be beneficial to place a suspect module 28 in its own executable entity 22 to avoid disrupting other modules 28 that would otherwise be terminated as well with the executable entity 22. Conversely, each executable entity 22 consumes footprint overhead, so efficiency suggests combining multiple modules 28 per executable entity 22.

It should be noted that the exemplary configuration disclosed herein employs a C++ development environment. In such an environment 10, the description herein as applied to the software entities process 26, module 28, subscriber 60, and event handler 62 employ technically operative language within the C++ development environment. These entities interoperate according to certain principles and deployment details according to the C++ language. Specifically, processes include one or more modules (components), which may be disabled, or passivated, as a whole. Each module 28 includes one or more subscribers (entities), which are instantiated with the module and may occupy several locations in memory as separate instantiations. The event handlers 62 are methods invoked, or referenced by the subscribers 60. The event handlers represent, in the exemplary configuration, methods including only sequence of instructions of reentrant code located at a particular position in memory and invoked by a plurality of instantiated subscribers. Accordingly, in the C++ development environment, a particular event handler occupies a logical existence only in the context of an instantiated, or corresponding, subscriber, as the description herein makes clear. Alternate implementation and deployment platforms may employ alternate invocation and instantiation practices, such as instantiating an event handler in entirety within the address space of each instantiated subscriber.

The infrastructure 10 therefore provides for development and deployment of multiple executable entities 22 each having multiple modules 28 (e.g., CORBA-based components) for performing particular tasks in the server 12. In such an infrastructure 10, particularly when a large number of executable entities 22 including many modules 28 are concerned, it is beneficial to insulate individual developers from details of other executable entities 22 and modules 28.

In a large complex system, such as the SAN environment operable to be supported by the infrastructure 10, many events within modules 28 may occur and have a need to be identified to trigger responsive operations in other modules 28. Certain class entities 25 (subscribers) have an interest in particular events and have event handler entities including instructions (methods) for responsive action to such an event. Certain other class entities 25 (publishers) operate to detect and inform the subscribers when the particular event occurs. Therefore, both subscribers and publishers have a need to access and process events via the event service 32. However, the event itself is typically a class which is therefore utilized by all subscribers and publishers, and typically may inherit other entities as well. In a complex system, there may be many such event types, or classes, for inheritance by the other class entities which employ the event. It may be cumbersome, however, for individual developers to inherit (incorporate) event classes which are extraneous or voluminous. Accordingly, arrangements of the invention provide an infrastructure in which the developer (user) inherits only the event class, typically a source code file, having the particular event of interest. Therefore, in contrast to conventional infrastructure environments, in which a class entity inherits many event definitions and associated files merely for a particular event. No inheritance is required.

In the exemplary implementation, either a dynamically linked library that implements the event service 32 or an implementation of the event service 32 that is fully integrated into the component server (as shown in this example in FIG. 1) may be employed. To allow event handler entities requiring both short and long processing times, the event service infrastructure employs a strategy for specifying the thread where a subscriber handles the event, in order of preference: 1) the event publisher's thread; 2) an eagerly spawned detached thread; 3) the Adaptive Communication Environment (ACE) Reactor thread provided by the event service 32, and 4) the ACE Task thread provided by the event service 32 following a Half-Synch, Half-Asynch pattern. The ACE reactor thread is discussed in greater detail in Douglas C. Schmidt and Stephen D. Huston. "C++ Network Programming," Vol. 1 and Vol. 2. Addison-Wesley, Reading, Mass., 2002, and the ACE task thread in Douglas C. Schmidt, Michael Stal, Hans Rohnert, and Frank Buschmann. "Pattern-Oriented Software Architecture: Patterns for Concurrent and Networked Objects." John Wiley & Sons, NY, 2000, both incorporated herein by reference.

The integrated implementation is, therefore, transparent to the component developers, which compares favorably with the more intrusive CORBA and J2EE event service implementations. The component framework 81 provides a multi-threaded ACE Task for each component, enabling the subscribers to handle events therein transparently. To simplify both the design and the usage of the Event Service, the framework can operate such that the event subscribers are deleted only upon component destruction.

The event service 32 can activate a component within a component server 80 as follows: The component's DLL is first loaded into the component server; next, a servant factory, provided by the DLL, creates the component's servant; finally, that servant incarnates the component's CORBA object. Conversely, a component is passivated or deactivated by etherealizing the CORBA object and unlinking the component's DLL from the component server.

Figure 2:
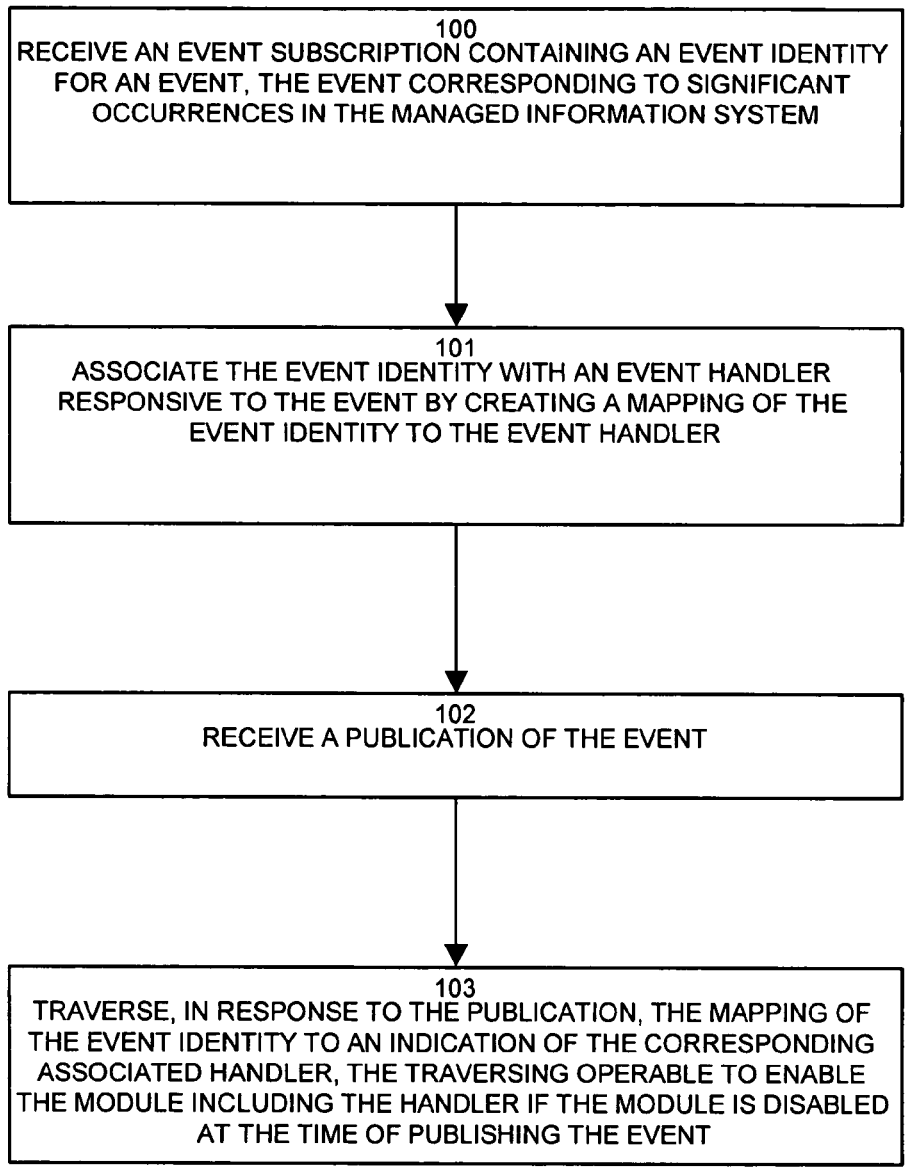
FIG. 2 is a flowchart of event subscription and publication as described herein.

FIG. 2 is a flowchart of event subscription and publication as described herein in accordance with one embodiment of the invention. Referring to FIGS. 1 and 2, the method for processing events in a managed information system according to the present invention includes, at step 100, receiving an event subscription containing an event identity for an event. The subscribed event corresponds to an event occurrence in the managed information system. For example, in a SAN management application, a typical exemplary event is a volume full event, indicating that a particular volume in a storage array is approaching maximum capacity. Such events vary in severity, and also optionally include event data with the event that quantifies or qualifies the event in greater detail. In the exemplary disk volume overflow event, the event data may include the identity of the disk volume, the current volume level, and the available volume level.

The event service 32 associates the event identity with an event handler (e.g., class entity 25 in one of the modules/components 28 in FIG. 1) responsive to the event by creating a mapping of the event identity to the event handler, as depicted at step 101. The event identity (event ID) is a unique identifier for the particular event class across the event service 32. In the particular exemplary configuration, the event ID is an integer value corresponding to the event. Alternate configurations include other identifiers, such as ASCII strings, binary or hex values, and object identifiers. The event handler 25 is a set of instructions, such as a method in the subscribing module 28, which the event service 30 (FIG. 3, below) invokes, or performs, in response to the occurrence of the event.

Subsequent to the association at step 101, a publishing entity 25 (publisher), such as another method or instruction set in the same or a different module 28, detects the significant occurrence and publishes the event. The publication corresponds to a method invocation by the publisher 25. The publisher 25 gathers relevant data corresponding to the event, and populates the event data for publication with the event. Note that an event may have any number of publishers 25 in the same or different modules 28, within the resource limitations of the server 12.

The event service 30 is responsive to the publication, and receives the publication of the event, as disclosed at step 102. Unless the event is limited to publication and subscriptions in the same module server 80, the event service 30 employs the shared memory portion 34 for publication, described further below. At step 103, in response to the publication, the event service 30 traverses the mapping of the event identity to an indication, or reference, of the corresponding associated handler (class entity) 25. The traversal operation determines if each subscribed module 28 is enabled, and if not, the event service 30 enables the module 28 including the handler 25 if the module 28 is disabled at the time of publishing the event. Therefore, the event service 30 determines the responsive modules 28 and corresponding handlers 25 for the event ID. The event service 30 therefore propagates the event such that each subscribed module 28 invokes the corresponding handler and provides the event data published by the publisher with the event.

Figure 3:
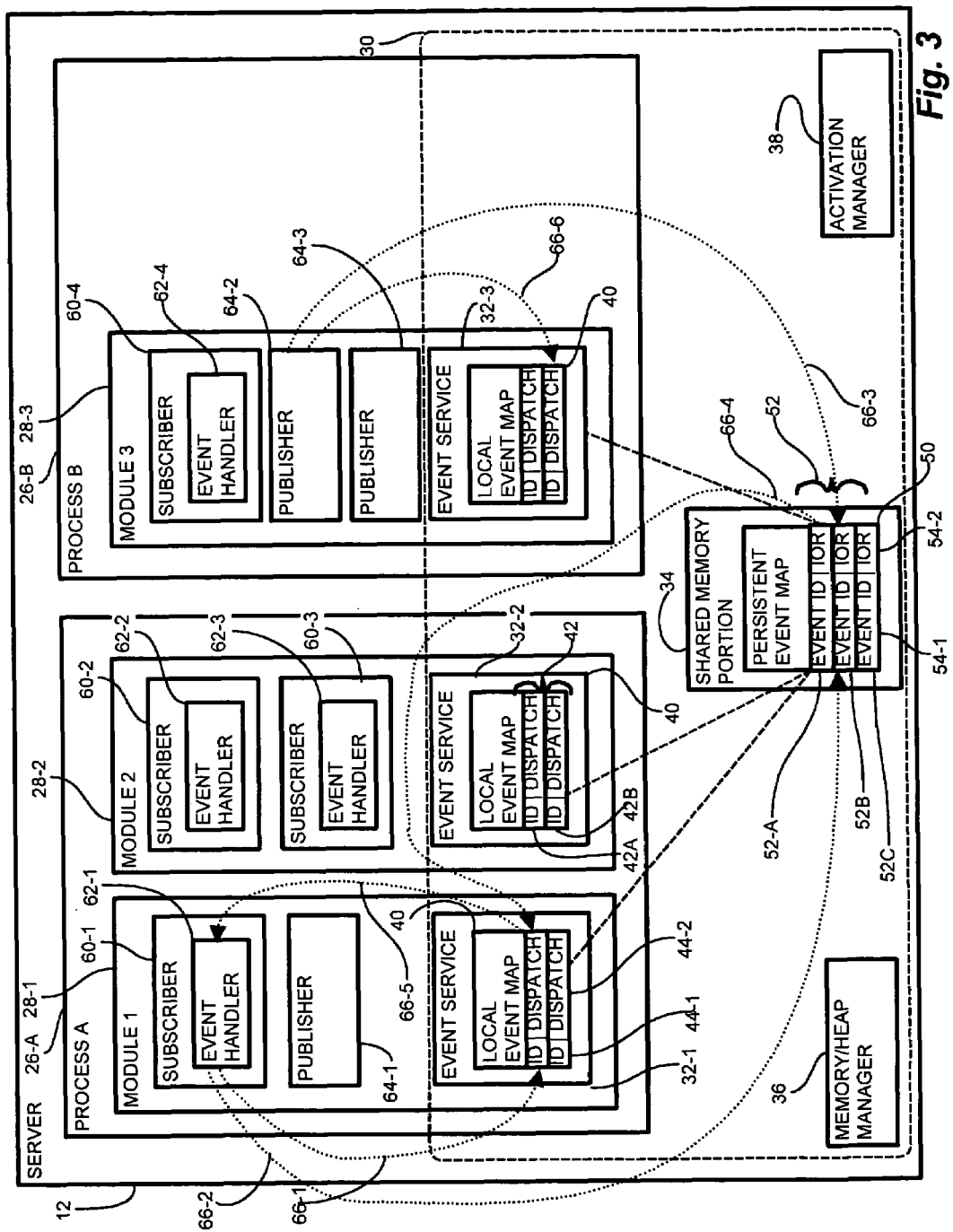
FIG. 3 is a block diagram of the event service in a server in the managed information environment.

FIG. 3 is a block diagram of the event service in a server 12 in the exemplary managed information environment. Referring to FIG. 3, in a particular exemplary configuration of the invention, the server 12 includes the processes 26A (process A) and 26B (process B) as executable entities 22. Process A includes modules 28-1 and 28-2, and process B includes module 28-3 (28 generally). In particular configurations, the modules 28 are components (e.g., CORBA components) written according to a deployment language such as C++, as is known to those of skill in the art. The event service infrastructure, collectively shown as dotted line 30, includes the event service 32 in the component server 80, residing in each process 26, shown as instantiations 32-1 ... 32-2 (32 generally), a shared memory portion 34, a memory/heap manager 36 and an activation manager 38.

As shown above, the event service 32 resides in each process 26, as will be discussed further below. Each instantiation 32-1 ... 32-3 is in communication with a local event map 40 maintained in associated with each module 28 having entries 42. Each local event map 40 entry 42 includes attributes event ID 44-1 and a dispatch command 44-2. The global event service (event service) 30 also includes the shared memory portion 34 having a persistent event map 50. The persistent event map 50 includes attributes event ID 54-1 and Interoperable Object Reference (IOR) 54-2, and associates each of the entries 42 in the local event maps 40 by the respective event ID 44-1 and 54-1, therefore shadowing the local event map 40 via the event ID 44-1, 54-1 as shown by dotted lines 46.

Each of the modules 28 includes class entities 25, specifically subscribers 60, event handlers 62, and publishers 64. Each subscriber 60 includes at least one event handler 62. Specifically, subscribers 60-1.60-4 include event handlers 62-1.62-4, respectively. Publishers 64 comprise publisher instantiations 64-1.64-3. Therefore, the modules 28 include subscribers 60 to an event, shown by event entries 52, which include event handlers 62 including instructions (methods) responsive to the event 52, and publishers 64 of the event 52, which trigger the corresponding event handler 62.

In operation, the subscriber 60-1, for example, including the event handler 62-1, subscribes to an event 52. The subscription creates an entry 42 in the local event map 40, shown by arrow 66-1, containing the association of event ID 44-1 and corresponding event handler and corresponding subscriber via a dispatch command 44-2, described further below. The subscription also creates another entry 52 in the persistent event map 50, associating the event ID 54-1 with the IOR 54-2 identifying the subscribing module 60-1, as shown by dotted line 66-2. Therefore, the event ID 54-1 establishes a mapping from the persistent event map 50 to the module 60-1 via the IOR 54-2, and from the local event map 40 of the referenced module 60-1 to the subscriber 60-1 and corresponding event handler 62-1 via the local dispatch command 44-2. Mapping and traversing is also discussed further below with respect to FIG. 7. Subsequent publishing of the event 52, discussed further below, employs the references from the publisher 64-2 to the event ID 54-1 entry 52 in the persistent map, and the reference from the publisher 64-2 to the local event map 66-6, also discussed further below. The event service 32 coordinates access from the persistent event map 50 to the local event map 32 of an invoked module 28, as determined from the IOR of the particular module 28 in the module reference field 54-2.

Figure 4:
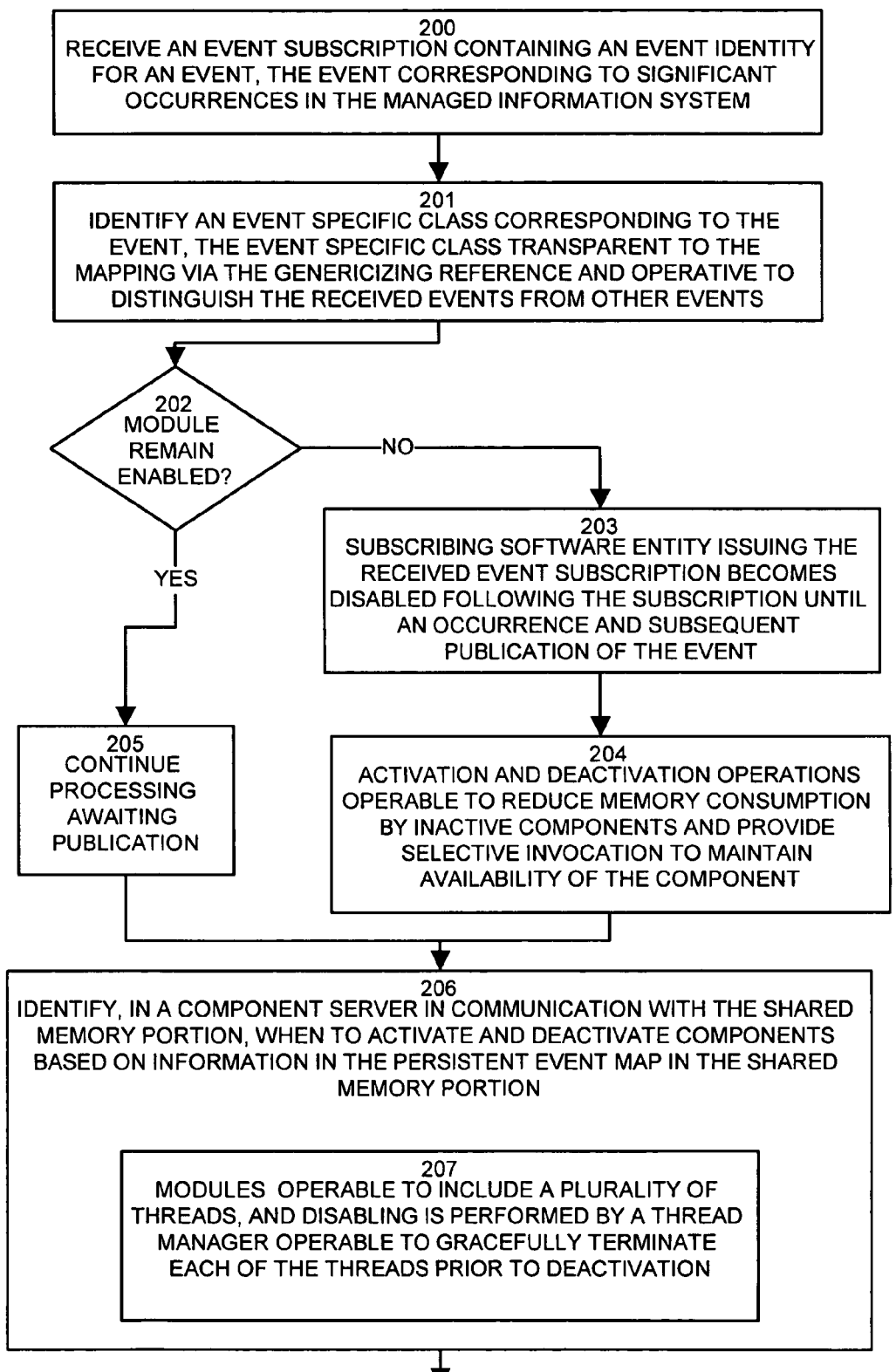
FIGS. 4-6 are a flowchart of subscribing and handling an event in the system of the present invention.
Figure 5:
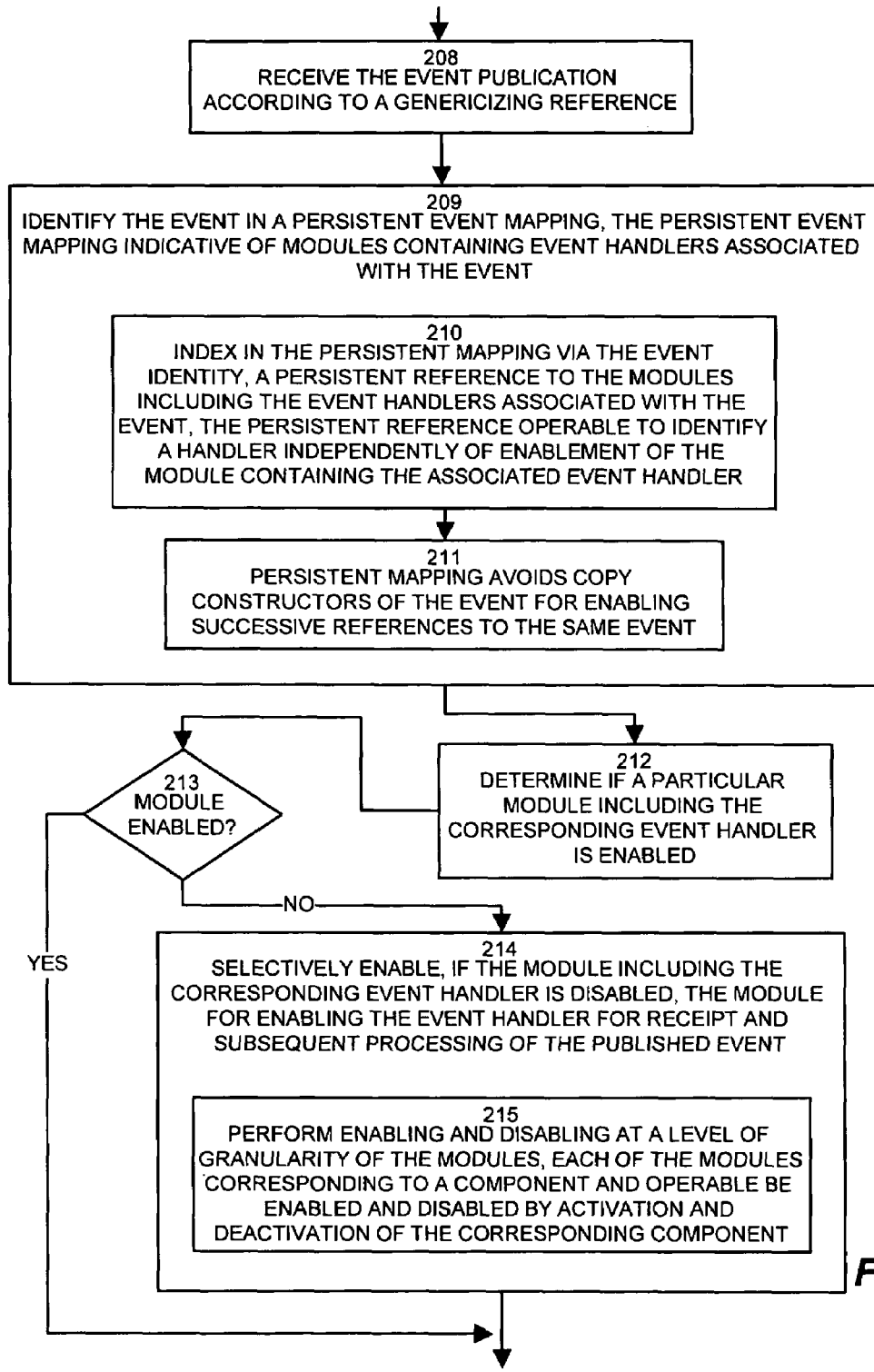
Figure 6:
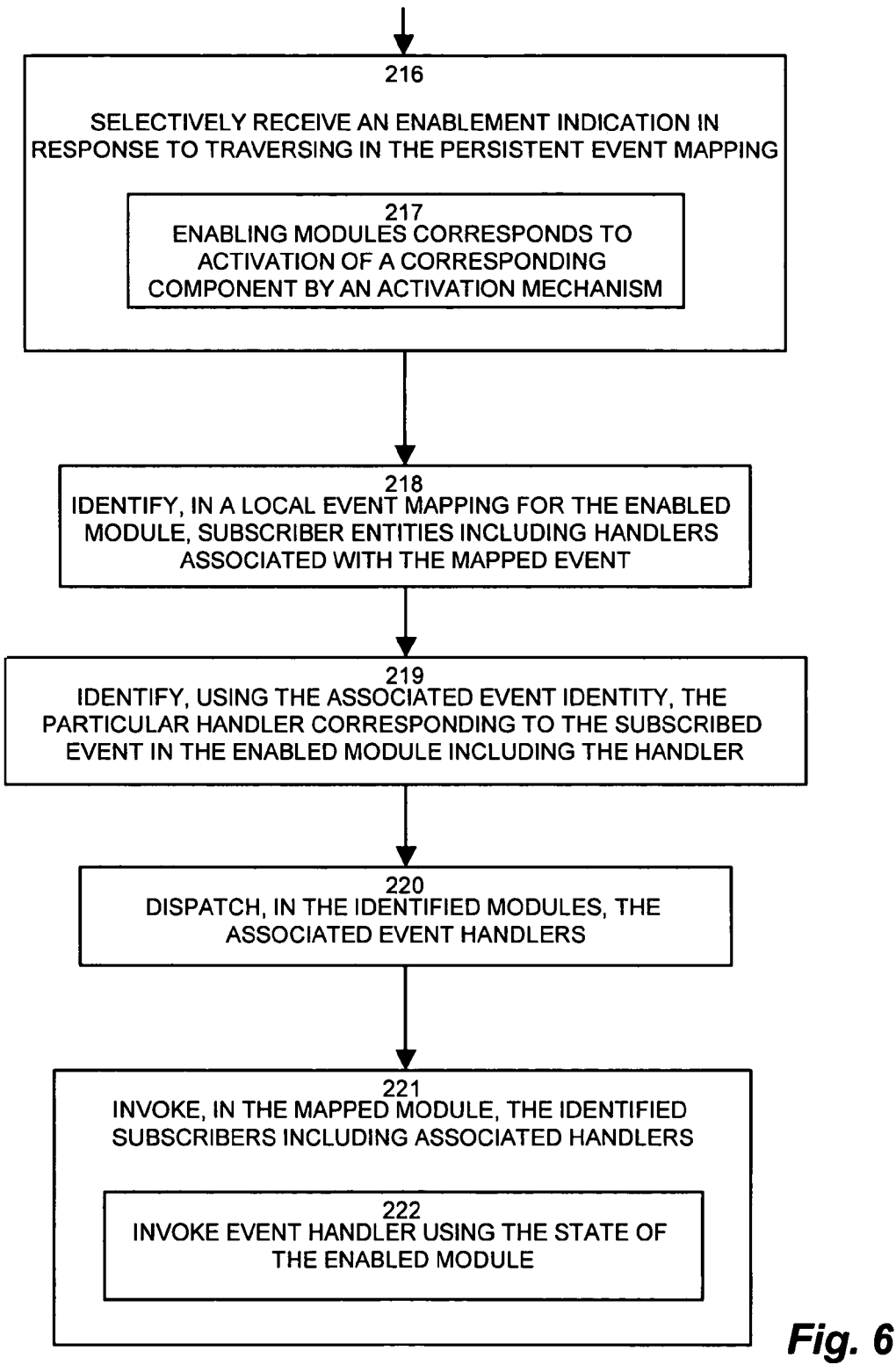

FIGS. 4-6 are a flowchart of subscribing and handling an event 52 in the system of the system of present invention, as discussed in FIG. 2, in greater detail. Referring to FIGS. 3-6, at step 200, the event service 30 receives an event subscription containing an event identity 54-1 for an event, in which the event corresponds to significant occurrences in the managed information system. In the exemplary configuration, the event subscription is a method invocation in a module 28 (component) by a subscriber 60 to the event 52. The subscriber 60 is an entity having an event handler 62, or method, for receiving and handling the event 52 and related event data, such as the disk volume full event discussed above.

In the exemplary C++ implementation, an event command class template "records," through templatization, the types of both the event and the subscriber 60. Additionally, the event command hosts a subscriber 60 reference and the smart event pointer. The event command verifies at compile time the presence of the proper event handler 62 within the subscriber's class, thereby making the event service 30 strongly typed. To reduce C++ code bloat, and to allow polymorphic containment, the event commands derive from a non-template class.

The event service 30 identifies an event specific class corresponding to the event 52, in which the event specific class is transparent to the mapping via the genericizing reference and is also operative to distinguish the received events from other events, as depicted at step 201. The event specific class is an event class defined by source code, such as C++ or other deployment language. The event class includes the event data definition. However, to allow subscriptions to the event prior to publication, the event service 30 defines the integer event ID 54-1 upon subscription, not at compile time. Upon subscription, the event service 30 scans the persistent event map 50 for the corresponding event. If there has not been a subscription of the event, the event service 30 assigns an integer event ID 54-1, which then remains the event ID for the duration of the server 12, as will be described further below with respect to event publication in FIGS. 9-12.

In further detail, in the exemplar implementation, the event-dispatching CORBA call must convey the event without specifying the event's type. Otherwise, each event type would require a specially tailored CORBA call, specified in OMG IDL. To resolve this problem, before invoking the event-dispatching CORBA call, we split the event information into two: the event id, obtained by invoking the C++ typeid operator, and the anonymized pointer to the event, obtained by casting the event pointer to the C++ void*. Following the invocation of the event-dispatching CORBA call, the event id 44-1 is used to retrieve the event commands from the component event service 32. As mentioned above, each event command "records" the event's type through templatization, thus allowing the regeneration of the typed event from the anonymized event pointer. Armed with the fully typed event, the event command can then invoke the subscriber's event handler, thus completing the event dispatch.

Following subscription, the subscriber module 28 may either remain enabled or become disabled. Enablement and disablement of the modules 28 allows resource conservation by mitigating footprint (memory) and processing cycles for modules 28 which are not currently needed for performing methods or instructions. At step 202, the event service performs a check to determine if the module 28 including the subscriber 60 becomes disabled. If the module 28 becomes disabled, then the subscribing software entity (subscriber) 60 issuing the received event subscription becomes disabled following the subscription until an occurrence and subsequent publication of the event by an event publisher 64, as depicted at step 203. As depicted at step 204, disabling corresponds to deactivation of the corresponding component 28 (module) by the activation manager 38, in which the activation and deactivation operations are operable to reduce memory consumption by inactive components 28 and provide selective invocation to maintain availability of the module 28. In the particular exemplary configuration, enablement and disablement corresponds to component 28 activation and deactivation, such as an implementation consistent with the Common Object Request Broker Architecture (CORBA), as is known to those of skill in the art.

Such activation and deactivation further involves the component server 80 in communication with the shared memory portion 34, which determines when to activate and deactivate the modules 28 based on information in the persistent event map 50 in the shared memory portion 34, as shown at step 206. The component server 80 further determines when to store the information in the component server 80 rather than the shared memory portion 34 if no other component servers 80 reference the information. Therefore, when only a single module server is used, in which the subscribers 60 and publishers 64 are local to the same module 28, the component event service 32 is sufficient to handle the events, and the event service 30 does not employ a persistent map entry 52. If the check at step 202 is such that the module 28 remains enabled, the module 28 continues routine processing awaiting publication of the event, as shown at step 205.

In further detail, in particular arrangements each of the modules 28 is operable to include a plurality of threads, and disabling is performed by a thread manager 78, described further below with respect to FIG. 7, operable to gracefully terminate each of the threads prior to deactivation. The threads correspond to sequences of instructions in the module 28 defined by the entities 72, 74 therein. Deactivation occurs by the thread manager 78 (FIG. 7, below) informing each of the threads of the termination and computing when each thread has attained a termination point, as depicted at step 207. Such a thread manager 78 determines when each thread attains a processing segment where atomic operations are complete and termination will not produce inconsistencies.

Module 28 processing continues until one of the publishers 64 detects the significant occurrence defining an event. Upon publication, at step 208, the event service 30 receives the event publication according to the genericizing reference. The event service 30 identifies the event 54-1 in the persistent event mapping 50, which, as described above stores the mappings 52 (associations) indicative of modules 28 containing event handlers 62 and corresponding subscribers 60 associated with the event. In the particular exemplary configuration shown, identifying involves indexing a persistent reference to the modules 28 including the event handler 62 and corresponding subscriber 60 associated with the event via the event identity, as depicted at step 210. The indexed persistent reference 52 is operable to identify a handler 62 independently of enablement of the module 28 containing the associated event handler and corresponding subscriber, i.e. the module 28 including the handler 62 itself need not be enabled at the time of event publication. As shown at step 211, in the exemplary arrangement, such a persistent mapping 52 of the event is operable to maintain the event independently of individual modules 28 referencing the event. Such independent maintenance of the event avoids a need for copy constructors of the event for enabling successive references to the same event. Alternatively, copy constructors may be employed in alternate arrangements to avoid successive publications of the same event overwriting or interfering with each other.

At step 212, based on indexing the module 28, the event service 30 determines if the particular module 28 including the corresponding event handler 62 and corresponding subscriber 60 is enabled. A check is performed, at step 213, and if the module 28 including the corresponding subscriber 60 and event handler 62 is disabled, the activation manager 38 selectively enables the module 28 including the subscriber 60 and event handler 62 for receipt and subsequent processing of the published event, as depicted at step 214. In the particular exemplary configuration, consistent with the thread manager 78 operation, the activation manager 38 performs enabling and disabling at a level of granularity of the modules 28, in which each of the modules 28 corresponds to a component and is operable be enabled and disabled by activation and deactivation of the corresponding component, as disclosed at step 215. Therefore, enablement and disablement of the modules 28 refers to, in the particular exemplary arrangement, activation and deactivation of a particular component. Such components are the portions of the process 26 which the activation manger enables and disables as a unit, including the corresponding subscriber 60 and event handler 62.

The indexed module 28 including the particular event handler and corresponding subscriber 60 selectively receiving an enablement indication from the activation manager 38 in response to the traversing in the persistent event map 50, as shown at step 216. In the exemplary configuration, as described above, enabling modules 28 corresponds to activation of a corresponding module 28 (component) by an activation mechanism in the activation manager 38.

From step 217, following activation of the corresponding module 28, or continuing from step 213, if the module 60 was already enabled, the module 28 identifies subscriber entities 60 including event handlers 62, associated with the mapped event, in the local event map 49 for the enabled module 60. The persistent event map 50, therefore, stores associations 52 of events to modules 28 including subscribers 60 having handlers 62, and the local event map 40 stores, in each module, the mapping of the event to the subscriber 60 including the handler 62.

At step 219, the module 28 identifies, using the associated event identity 44-1, the particular subscriber 60 and included event handler 62 corresponding to the subscribed event in the enabled module 28. The component event service 32 in the module dispatches the associated event handler via the mapping of the event ID 44-1 and the dispatch command 44-2 in the local event map 40, as depicted at step 220. The dispatch command 44-2 includes a reference 66-5 to the location of the subscriber 60 and event handler 62 in the module 28, which may be dynamic from enablement to enablement of the module 28. The dispatch command 44-2 further includes the event data, which had been typecast via the genericizing reference (e.g. void*) from the persistent event map 50. At step 221, the dispatch command 44-2 invokes the event handler 62 by invoking the identified subscriber 60 including associated event handlers 62, using the state of the subscriber in the enabled module 28, as shown at step 221. The parameters available to the subscriber 60 include the event data for the particular invocation attempt, as depicted at step 222.

Figure 7:
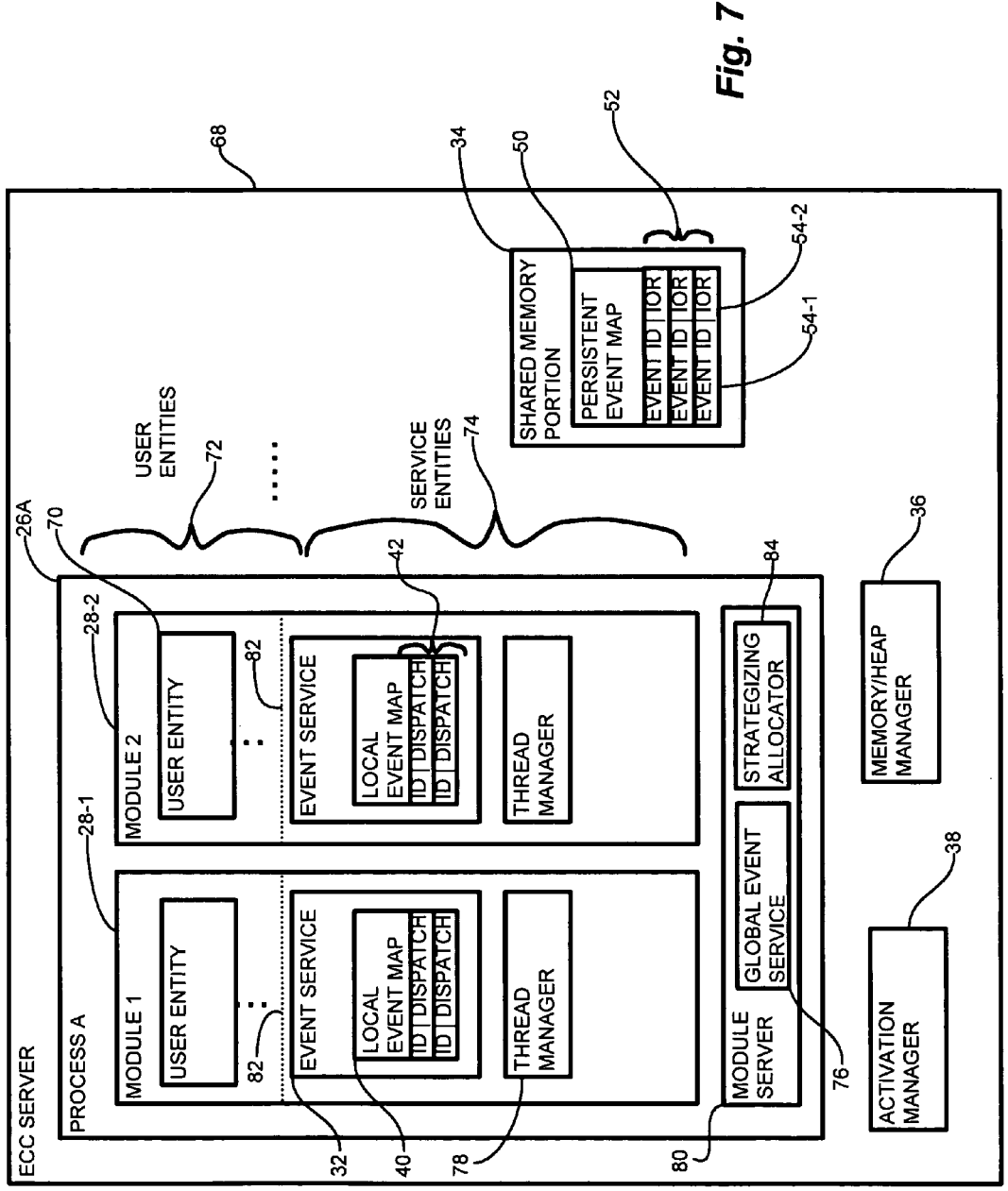
FIG. 7 is a block diagram of the event service infrastructure of FIG. 3 in greater detail.

FIG. 7 is a block diagram of the event service 30 infrastructure of FIG. 3 in greater detail showing the event service infrastructure details suppressed from the user perspective. In a development and deployment environment, the infrastructure 10 provides an event service interface to the user/developer by allowing the user to reference only the event class corresponding to a particular event. Such detail suppression eliminates extraneous details and inheritance chains from the user perspective. By providing such a seamless interface, the infrastructure reduces the complexity from the user perspective and mitigates the possibility of inaccuracies in the resulting code.

Referring to FIG. 7, an exemplary configuration of the server 12 in a storage area network 10 as in FIG. 1. The server 12 in the exemplary configuration is an ECC server 68, operable according to the general notion of the server/machine 12 of FIG. 1. The ECC server 68 includes one or more processes 26-A, each including entities 25. The server 68 further distinguishes user entities 72, including subscriber 60 entities, event handler 62 entities, and publisher entities 64, shown generally as a user entity 70, and service entities 74, demarcated by dotted line 80, in each particular module 28. This view depicts an architecture in which the server 68 includes a set of entities 25, arranged into processes 26, each of which includes software based entities 25 operable for either user or service functions, and does not readily demarcate layers of entities, processes, or modules to define the event service infrastructure 30.

The class entities 25 which are included in the service entities 74 are those entities 25 which provide the event service infrastructure 30, as distinguished from the user entities 72. The service entities 74 therefore include the aforementioned component event service 32 entity. In particular configurations, the event service 32 may be viewed as implemented in a distributed manner across the server 68. In this manner, the local event map 40 resides in an event service 32 instantiation in each module 28. In particular configurations, an additional global event service entity 76 complements the component server 80 via an instantiation in each module 28, for receiving enablement and invocation requests from the component server 80. Alternatively, the component server 80 may manipulate the event service 32 and local event map 40, hence the dotted line around the global event service entity 76. Each module 28 also includes a thread manager entity, within a particular module, and a component server 80, specific to a particular process 26.

In operation, the global event service entity 76 coordinates access to the persistent event map 50 in the shared memory portion 34 by each of the modules 28. Since the shared memory portion is accessible by each module 28, the shared memory portion 34 exists as long as any constituent modules 28 exist. The thread manager entity 78 coordinates graceful disabling of the modules 28, by identifying each thread in a module 28 and determining when the thread is at a safe disabling point. The component server 80 controls enabling and disabling of each module 28 in the process 26.

Figure 8:
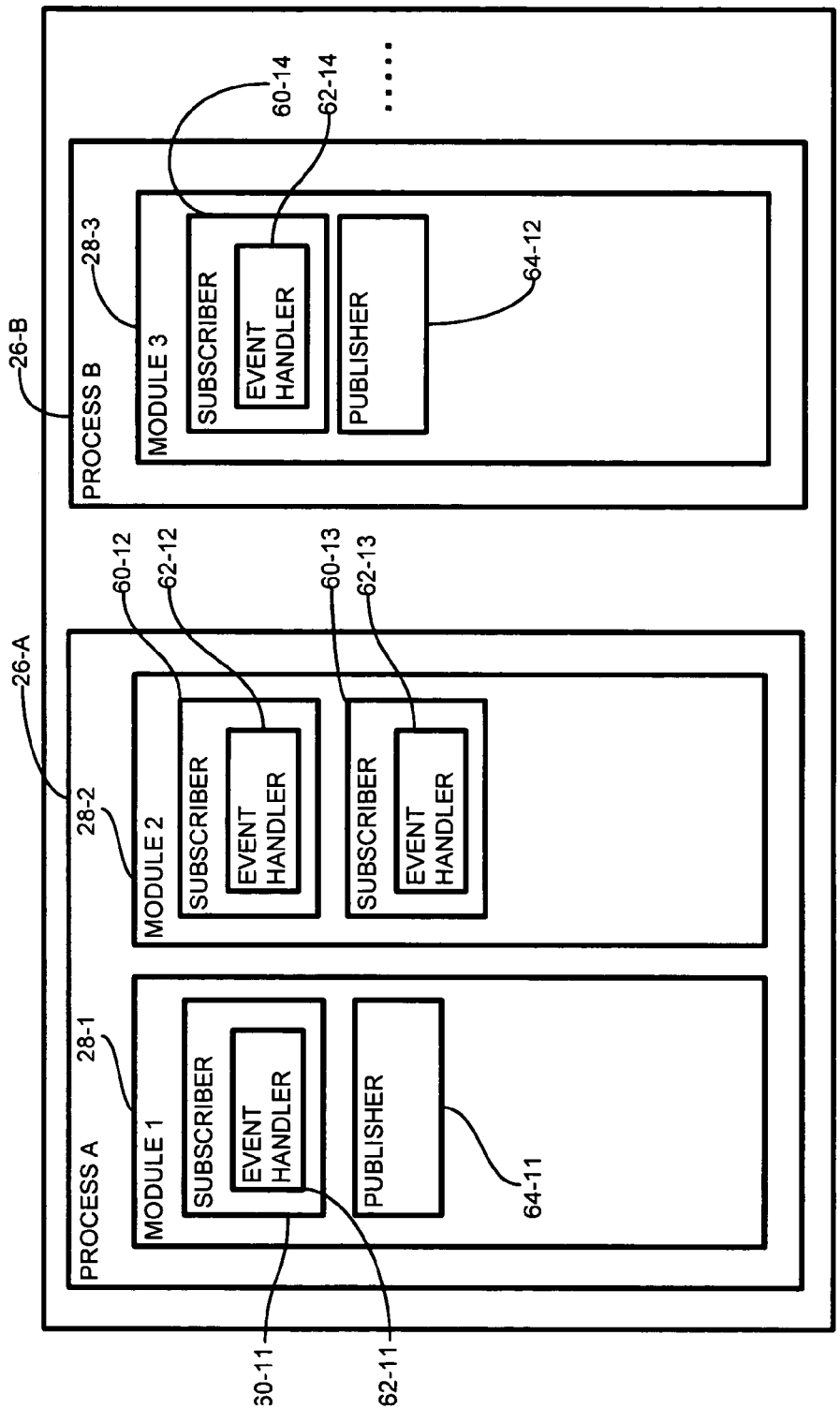
FIG. 8 is a block diagram of the user view for defining and dispatching an event in the event service infrastructure.
Figure 9:
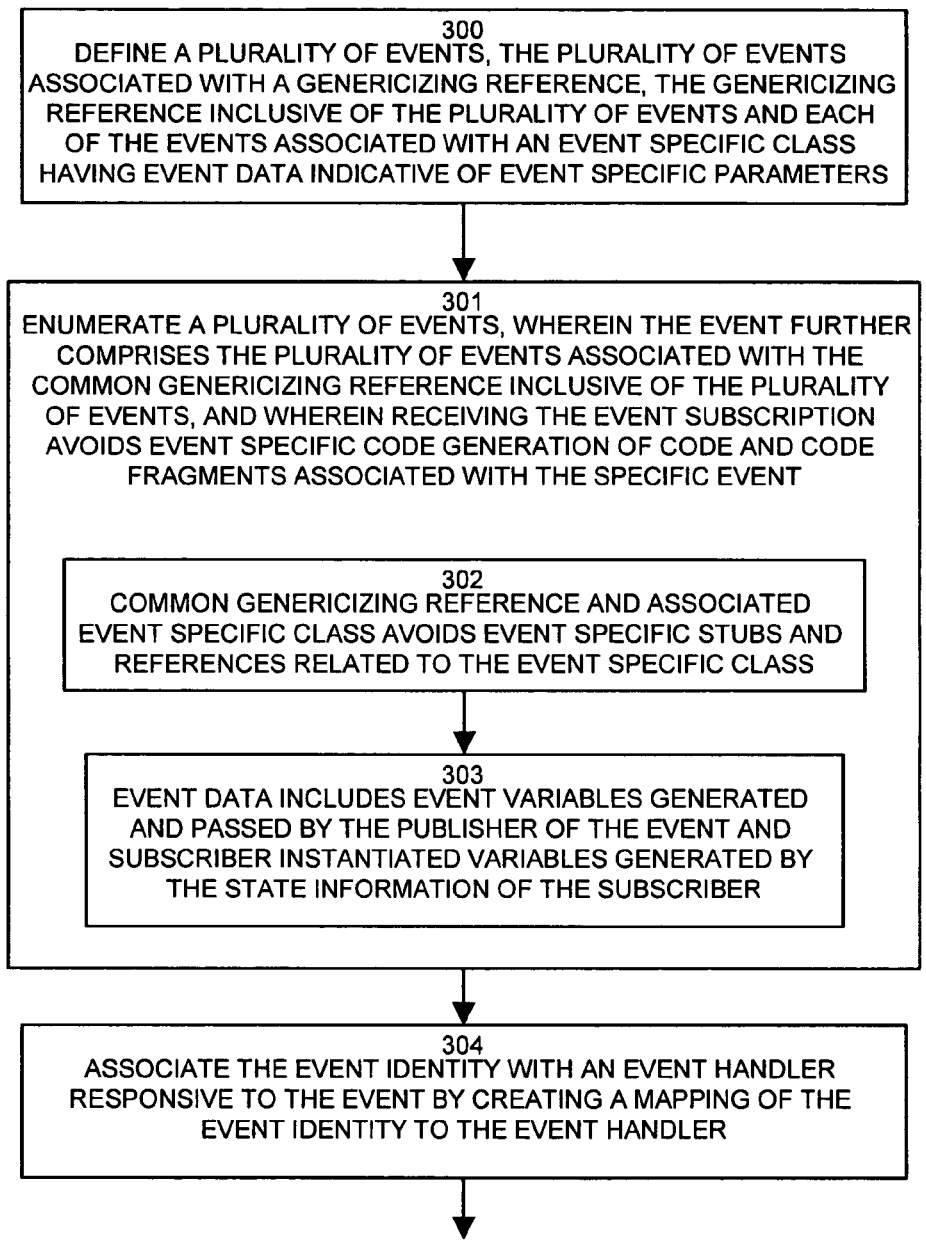
FIGS. 9-12 are a flowchart of defining and dispatching an event in the system of the present invention.
Figure 10:
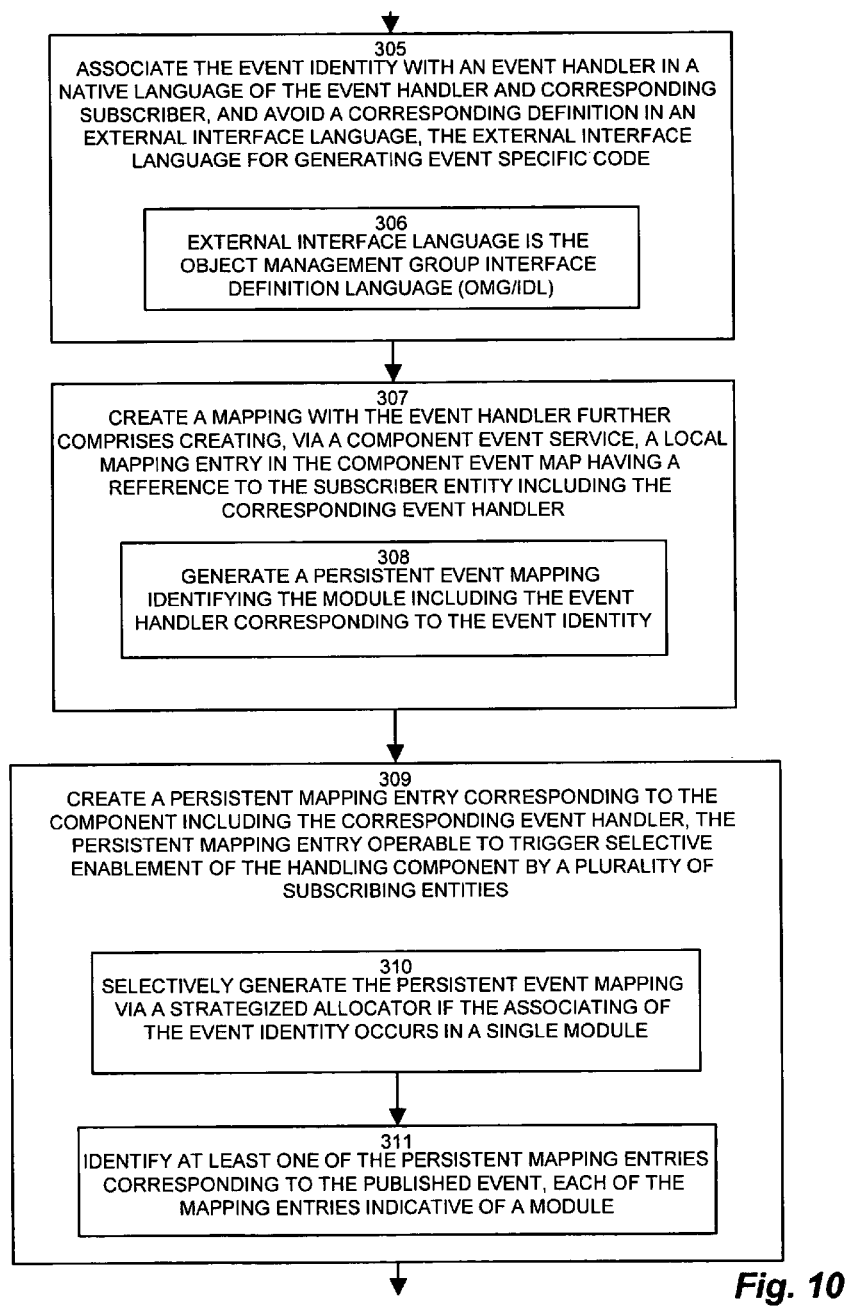
Figure 11:
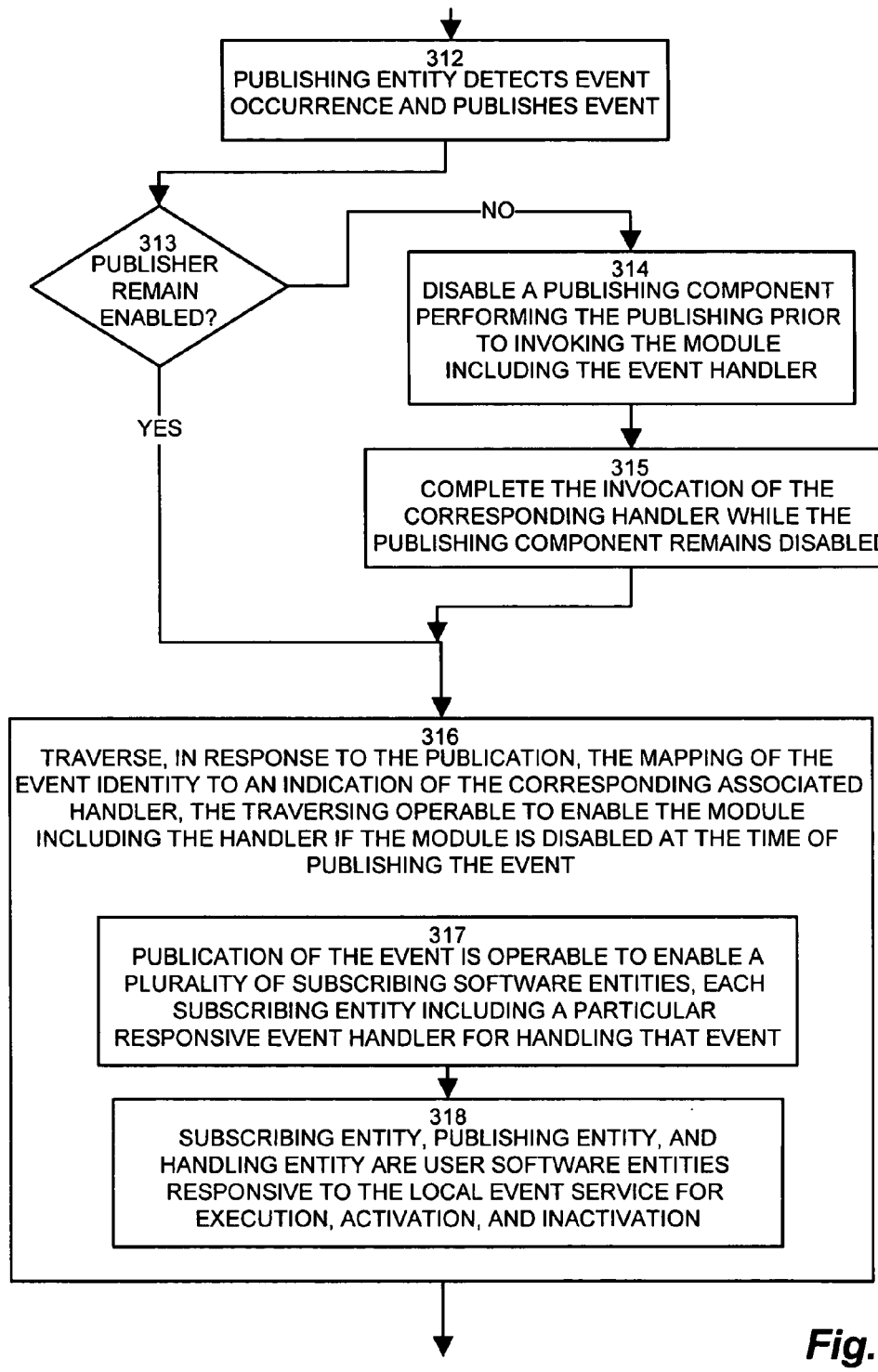
Figure 12:
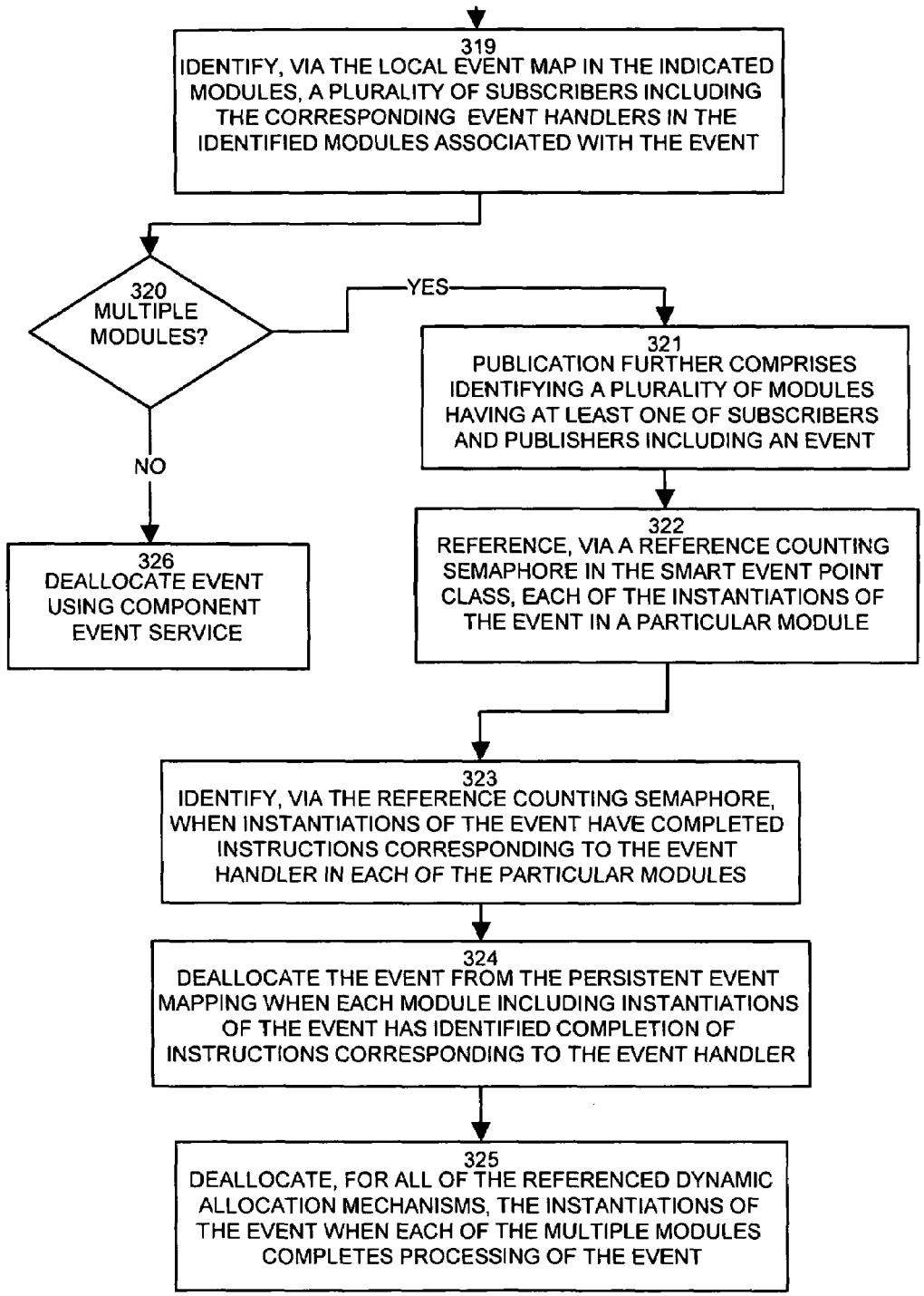

FIG. 8 is a block diagram of the user view for defining and dispatching an event in the event service infrastructure. Referring to FIGS. 7 and 8, in the exemplary configuration disclosed, the event service 30 is operable to provide subscription, publication and invocation services for modules performing on a server. As indicated above, the modules include user entities 72 and service entities 74. One approach of the system of the invention is to remove complexity from the user entities 72 in invoking the event service. Accordingly, the user entities need not be aware of the event service 30 other than the publication and subscription calls. Since the event service 30 coordinates subscriptions, publications, and invocations across multiple processes 26 and modules 28 on the sever 12, individual user entities 72 need not be concerned with deployment in a particular module 28 or process 26. This suppression of detail allows module 28 deployment in processes 26 according to performance and reliability factors, and removes the need to focus on event publication mechanics when designing modules 28 into processes 26.

The user, or developer, view of the server 68 includes only the processes 26, modules 28, subscribers 60, event handlers 62, and publishers 64. Subscribers 60 to an event may subscribe to an event specifying a particular event handler 62 for an event without specifying or mandating a particular module 28 or process 26 for the subscriber 60 to perform in (execute). Similarly, the publishers 64 of the event need not perform in the same module 28 or process 26 as the respective subscribers. Since the event service 30 includes the persistent event map 50 for mapping subscribers 60 to publishers across processes 26, by employing the IOR of the modules 28 (components) the subscribers 60 need not be resident in the same module 28 as the publishers 64. Further, the component event service 32 and component server 80 map the events to the handlers 62 via the dispatch command 44-2 for each particular module 28. Accordingly, the individual users need not specify details concerning the correlation of event publishers 64 and subscribers 60.

The foregoing description of subscribing to and publishing an event according to the event service 30 discloses the event service from the perspective of a user employing or developing user entities operable for subscribing to or detecting and publishing an event. A converse view discloses the perspective of an infrastructure developer providing service entities for defining and dispatching the event. Accordingly, FIGS. 9-12 disclose a flowchart of defining and dispatching an event in the system of the present invention. Referring to FIGS. 7 and 9-12, the event service 30 defines a plurality of events, each of which is associated with a genericizing reference. Each of the events is associated with an event specific class having event data indicative of event specific parameters. In the particular exemplary configuration, the event class is an object class embodied in source code in a source language such as C++. The event class therefore specifies, for each event type, the event handler 62 and associated event data for utilization by the subscriber 60. As described above, the user includes only the event class, and need not directly code or specify other event service classes or inclusions, in order to publish or subscribe to the event.

At step 301, the event service enumerates, or identifies, the plurality of events, each associated with the common genericizing reference 66-4. The genericizing reference is a typeless reference operable to refer to any of the events and event data via subsequent typecasting. In the exemplary configuration the genericizing reference is a void* pointer which a publisher 64 employs to populate the event data and which the local event service 32 casts to the event data type of the event to receive and interpret the event parameters. In this manner, the genericizing reference 66-4 provided by the integer event ID 54-1 avoids event specific code generation and code fragments associated with the specific events, such as may occur if a publisher 64 or subscriber 60 were forced to inherit all event classes for unpublished or unsubscribed events.

In further detail, the common genericizing reference 66-4 and associated event specific class avoids event specific stubs and references related to the event specific class, as depicted at step 301. Certain interpreters and compilers may trigger additional code generation upon receiving each event class, in observance of testing and/or standards compliance. For example, the OMG/IDL interface incorporates stubs and definitions operable for testing and inheritance for each particular event class.

For each event 52, the event data includes event variables generated and passed by the publisher of the event and subscriber instantiated variables generated by the state information of the subscriber, as disclosed at step 303. The publisher 64 populates the event data, which the event service passes to the handler 62. Further, as the exemplary handler 62 is a method of the subscriber 60, the event handler 62 has access to the state, or variable (attributes), of the subscriber as well.

The event service 30, in response to the subscribe command, associates the event identity 44-1, 54-1 with the event handler 62 and corresponding subscriber 60 responsive to the event by creating a mapping of the event identity 44-1, 54-1 to the event handler 60 and corresponding subscriber 60, as disclosed at step 304. The association of the event identity with the event handler 62 occurs in a native language of the event handler 62 and corresponding subscriber 60, such as C++, and avoids a corresponding definition in an external interface language, the external interface language for generating event specific code as depicted at step 305. Further, as described above with respect to detail suppression, the external language interface which the association avoids may, in a particular exemplary configuration, be the Object Management Group Interface Definition Language (OMG/IDL), as disclosed at step 306.

Upon receiving the event subscription, at step 307, the event service 30 associates the event identity 44-1, 54-1 by creating a mapping with the event handler and corresponding subscriber and the event. The component event service 32 creates a local mapping entry 42 in the local event map 40. The entry 42 includes a reference to the subscriber entity 60 including the corresponding event handler 62 via the dispatch comment 44-2, as show by arrow 66-5 (FIG. 3). The event service 30 also generates the persistent event mapping entry 52 and Event ID for identifying the module 28 including the event handler and corresponding subscriber 60 corresponding to the event identity 54-1, as depicted at step 308 and shown by arrow 66-4. In the particular exemplary configuration, the event ID 54-1 is a unique integer value corresponding to the event. The event service 30 assigns the event ID 54-1 when an event is subscribed to. The first subscription causes the event to receive the next available event ID 54-1. Successive subscriptions to the same event receive the already assigned event ID 54-1. The component event service 32 stores the event ID in the ID field 44-1 in the local event map 40.

In accordance with the features of the exemplary integrated implementation discussed herein, the event service 30 distributes the event subscription information into multiple locations. A portion of the global event service 76 resides in each respective module server 80 and maps event types to modules 28 (components). Each component 28 hosts its own component event service 32, which maps event types to event dispatch commands 44-2. Splitting the event subscription information in this manner allows on-demand passivation of both subscribers 60 and publishers 64. The subscribing components 28 are determined by indexing via the global event service 76 with the event's type. Each such component 28 will be activated, if necessary, by the event-dispatching CORBA call. In the context of this call, the invoked component 28 determines the subscribers 60 for that event by querying its component event service 32. The event is then published to each subscriber 60 instance, which proceeds to handle the event in the event handler 62 member function. Notice that the purpose of the event-dispatching CORBA call is to activate the components 28 on demand so that subscribers 60 may handle events at any time with no race conditions.

The event service 30 uses the event ID 54-1 for creating a persistent mapping entry 52 in the persistent event map 50 which corresponds to the module 28 including the corresponding event handler 62, in which the persistent mapping entry 52 is operable to trigger selective enablement of the handling module 28 by a plurality of subscribing entities 60, as disclosed at step 311. The event service 30 further selectively generates the persistent event mapping via a strategizing allocator 84 if the associating of the event identity occurs in a single module server 80, as depicted at step 310. The strategizing allocator 84 employs the component server 80 memory rather than shared memory 34 to conserve system resources in the shared memory portion 34 when only a single process 26 includes subscribers 60 and publishers 64 of the event 52. Therefore, a strategized Standard Template Library (STL) allocator adapter accesses either a local or a shared memory pool through an ACE_Allocator instance. When a single component server 80 is deployed, the local memory pool suffices. If multiple component server 80 processes are deployed, however, the shared memory pool 34 is used instead. Armed with the strategized allocator 84, the developers of the events can exploit the full power of the STL, which is part of the C++ Standard Library, as is known to those of skill in the art. At step 311, the event service 30 identifies, employing the persistent event map 50, the module 28 corresponding to the subscribed event, since each of the mapping entries is indicative of a module 28 for invocation.

At step 312, a publisher 64 detects the occurrence of an event and publishes the event 52. As indicated above, an event is a significant occurrence which warrants notice to a responsible entity for possible further investigation and/or diagnosis, such as the exemplary disk volume overflow event described above. Following publication, the publisher 64 need not remain enabled, and accordingly, at step 313, a check is performed to determine the status of the publishing module 28. Depending on the check at step 313, the activation manager disables the publishing module 28 performing the publishing prior to invoking the module 28 including the event handler 62, as depicted at step 314. As indicated above, the publisher 64 need not remain enabled during event propagation and handling. Accordingly, at step 315, the event service 30 may complete the invocation of the corresponding handler 62 while the publishing component 28 remains disabled.

At step 316, the event service 30 traverses, in response to the publication, the mapping of the event identity 54-1 to an indication of the corresponding associated handler 62. The traversal parses the persistent event map 50 to identify modules 28 having subscribers 60 including event handlers 62 for the published event. As indicated above, the activation manager 38 ensures that the traversal is operable to enable the module 28 including the handler 62 if the module 28 is disabled at the time of publishing the event, and enables the appropriate module 28 accordingly.

The activation manager 38 may enable a plurality of subscribing software entities 60, in which each subscribing entity 60 including a particular responsive event handler 62 for handling that event, as depicted at step 317. In further detail, each of the subscribing entity 60, publishing entity 64, and handling entity 62 are user software entities responsive to the local event service 32 for execution, activation, and inactivation. Each of these entities 25, in the particular exemplary configuration, is a method, or set of operations, compiled or interpreted accordingly. The local event service 32 is responsive to the event service 24, in conjunction with the shared memory portion 34 for mapping the global event service provided by the persistent event map 50.

The local event service 32, for each of the modules 28, identifies, via the local event map in the indicated modules, each of the subscribers 60 including the corresponding event handlers 62 in the identified modules 28 associated with (subscribed to) the event. A check is performed, at step 320, to determine if the event service 30 found multiple modules 28 corresponding to the event. When multiple modules 28 assist in processing an event 52, the event service 30 determines when all modules 28 have completed handling so that memory allocations corresponding to the event 52 may be disposed.

Accordingly, to assist in allocating and deallocation memory for event handling, the event service 30 invokes comprising a smart event pointer class, in which publication further comprises identifying a plurality of modules having at least one of subscribers and publishers including an event, as depicted at step 321. The smart event pointer class functions as a reference-counted, multi-process, smart pointer to manage the event's lifecycle across multiple component server processes 26. This multi-process functionality is achieved by placing both the event 52 and its reference counter in shared memory. The event service 30 references, via a reference counting semaphore or other counting mechanism in the smart event point class, each of the instantiations of the event in a particular module 28, as disclosed at step 322.

The event service 30 identifies, via the reference counting semaphore, when instantiations of the event 52 have completed instructions corresponding to the event handler 62 in each of the particular subscribers 60, as shown at step 323. The event service 30 deallocates the event from the shared memory 34 when each module 28 including instantiations of the event 52 has identified completion of instructions corresponding to the event handler 62, as disclosed at step 324. Once identifying completion of all subscribed event handlers 62, at step 325, the event service deallocates, for all of the referenced dynamic allocation mechanisms in the shared memory portion 34, each of the instantiations of the event 52 when each of the multiple modules 28 completes processing of the event.

Therefore, in the exemplary implementation, the memory/heap manager 36 ensures that memory allocation and deallocation remain consistent with respect to the portion of memory in which an allocation was made. Unless explicitly instantiated, the compiler determines the compilation unit where the template code is emitted. It is beneficial for the component server 80 that each dynamic memory allocation be followed by a corresponding deletion from the same memory pool. To guarantee this correspondence, each class template features a polymorphic method void delete_this( ), which then simply invokes delete on itself by issuing: delete this. Controlled by an instance of a custom smart pointer, such a class template automatically invokes the delete_this( ) method upon destruction. This guarantees that deletion occurs in the same memory pool as allocation. Consequently, components compiled with different compilation flags can freely interoperate within a single component server 80. Further, in the exemplary C++ implementation, the memory pool handle has the property that even though the handle is initialized after entering the main( ), the handle is externalized as an immutable entity.

Alternatively, if the check at step 320 indicates that only one module was found for the event, then the event service deallocates the event using the component event service processing the event, as depicted at step 326.

The event service infrastructure disclosed herein may encompass a variety of alternate deployment environments. In a particular configuration, the exemplary SAN management application discussed may be the EMC Control Center (ECC) application, marketed commercially by EMC corporation of Hopkinton, Mass., assignee of the present application.

Those skilled in the art should readily appreciate that the programs and methods for defining, subscribing to and publishing events as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for defining, subscribing to and publishing events has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for processing events in a managed information system comprising:
   defining a plurality of events, the plurality of events associated with a genericizing reference, the genericizing reference inclusive of the plurality of events and each of the events associated with an event specific class having event data indicative of event specific parameters, each of the events defined independently of an underlying delivery infrastructure;
   receiving an event subscription containing an event identity for an event, the event corresponding to reportable occurrences in the managed information system;
   associating the event identity with an event handler responsive to the event by creating a mapping of the event identity to the event handler;
   receiving a publication of the event;
   traversing, in response to the publication, the mapping of the event identity to an indication of the corresponding associated handler, the traversing operable to enable the module including the event handler if the module is disabled at the time of publishing the event, such that the enabling of modules corresponds to activation of a corresponding component by an activation mechanism, and disabling corresponding to deactivation of the corresponding component by the activation mechanism,
   the activation and deactivation operations being operable to reduce memory consumption by inactive components and provide selective invocation to maintain availability of the component, the enabling and disabling performed at a level of granularity of the modules, each of the modules corresponding to a component and operable be enabled and disabled by activation and deactivation of the corresponding component, the event data including event variables generated and passed by the publisher of the event and subscriber instantiated variables generated by the state information of the subscriber;
   selectively enabling, if the module including the corresponding event handler is disabled, the module for enabling the event handler for receipt and subsequent processing of the published event; and
   invoking the module including the corresponding event handler via the mapping.

2. The method of claim 1 further comprising:
   identifying, using the associated event identity, the particular handler corresponding to the subscribed event in the enabled module including the handler;
   invoking, using the state of the enabled module, the event handler being an application defined event handlers responsive to the reportable occurrences.

3. The method of claim 1 wherein traversing further comprises:
   receiving the event publication according to a genericizing reference; and
      identifying an event specific class corresponding to the event, the event specific class transparent to the mapping via the genericizing reference and operative to distinguish the received events from other events.

4. The method of claim 1 wherein traversing further comprises:
   determining if a particular module including the corresponding event handler is enabled.

5. The method of claim 4 further comprising, following selective enabling of the module containing the corresponding handler:
   determining the mapping of the enabled module and corresponding event handler.

6. The method of claim 1 wherein traversing further comprises
   identifying the event in a persistent event mapping, the persistent event mapping indicative of modules containing event handlers associated with the event; and
   dispatching, in the identified modules, the associated event handlers.

7. The method of claim 6 wherein dispatching further comprises:
   selectively receiving an enablement indication in response to traversing in the persistent event mapping;
   identifying, in a local event mapping for the enabled module, subscriber entities including handlers associated with the mapped event; and
   invoking, in the mapped module, the identified subscribers including associated handlers.

8. The method of claim 6 wherein the persistent mapping of the event is operable to maintain the event independently of individual modules referencing the event, the independent maintenance operable to avoid copy constructors of the event for enabling successive references to the same event.

9. The method of claim 2 further comprising:
  disabling a publishing component performing the publishing prior to invoking the module including the event handler; and
    completing the invocation of the corresponding handler while the publishing component remains disabled.

10. The method of claim 1 further comprising enumerating a plurality of events, wherein the event further comprises the plurality of events associated with the common genericizing reference inclusive of the plurality of events, and wherein receiving the event subscription avoids event specific code generation of code and code fragments associated with the specific event.

11. The method of claim 1 wherein the common genericizing reference and associated event specific class avoids event specific stubs and references related to the event specific class.

12. The method of claim 1 wherein a subscribing software entity issuing the received event subscription becomes disabled following the subscription until an occurrence and subsequent publication of the event.

13. The method of claim 1 wherein publication of the event is operable to enable a plurality of subscribing software entities, each subscribing entity including a particular responsive event handler for handling that event.

14. The method of claim 6 wherein traversing further comprises indexing, in the persistent mapping via the event identity, a persistent reference to the modules including the event handlers associated with the event, the persistent reference operable to identify a handler independently of enablement of the module containing the associated event handler.

15. The method of claim 1 wherein associating the event identity by creating a mapping with the event handler further comprises:
  creating, via a component event service, a local mapping entry in the component event map having a reference to the subscriber entity including the corresponding event handler, and
  creating a persistent mapping entry corresponding to the component including the corresponding event handler, the persistent mapping entry operable to trigger selective enablement of the handling component by a plurality of subscribing entities, wherein mapping further comprises:
  identifying at least one of the persistent mapping entries corresponding to the published event, each of the mapping entries indicative of a module; and
  identifying, via the local event map in the indicated modules, a plurality of subscribers including the corresponding event handlers in the identified modules associated with the event.

16. The method of claim 1 wherein activation and deactivation further comprises identifying, in a component server in communication with the shared memory portion, when to activate and deactivate components based on information in the persistent event map in the shared memory portion, and further for determining when to store the information in the component server rather than shared memory if no other component servers reference the information.

17. The method of claim 1 wherein each of the modules is operable to include a plurality of threads, and disabling is performed by a thread manager operable to gracefully terminate each of the threads prior to deactivation, deactivation occurring by informing each of the threads of the termination and computing when each thread has attained a termination point.

18. The method of claim 1 wherein associating the event identity with an event handler occurs in a native language of the event handler and corresponding subscriber, and avoids a corresponding definition in an external interface language, the external interface language for generating event specific code.

19. The method of claim 18 wherein the external interface language is an Interface Definition Language.

20. The method of claim 19 wherein associating the event identity with an event handler further comprises generating a local mapping via a component event service identifying a subscribing entity including an event handler corresponding to the event identity, and
  generating a persistent event mapping identifying the module including the event handler corresponding to the event identity.

21. The method of claim 20 further comprising selectively generating the persistent event mapping via a strategized allocator if the associating of the event identity occurs in a single module.

22. The method of claim 1 further comprising a smart event pointer class, wherein publication further comprises:
  identifying a plurality of modules having at least one of subscribers and publishers including an event;
  referencing, via a reference counting semaphore in the smart event point class, each of the instantiations of the event in a particular module;
  identifying, via the reference counting semaphore, when instantiations of the event have completed instructions corresponding to the event handler in each of the particular modules; and
  deallocating the event from the persistent event mapping when each module including instantiations of the event has identified completion of instructions corresponding to the event handler.

23. The method of claim 22 further comprising:
  maintaining references to instantiations of the event across multiple modules via the reference counting semaphore, the multiple modules corresponding to a plurality of dynamic allocation mechanisms; and
  deallocating, for all of the referenced dynamic allocation mechanisms, the instantiations of the event when each of the multiple modules completes processing of the event.

24. The method of claim 1 wherein the subscribing entity, publishing entity, and handling entity are user software entities responsive to the local event service for execution, activation, and inactivation.

25. The method of claim 2 wherein invoking further comprises selective activation of components including associated event handlers, the event handlers in inactive components responding to the dispatch upon activation.

26. The method of claim 25 wherein the components including the event handlers need not be active during the event publication, the inactive event handlers being invoked accordingly in response to the dispatching, wherein unavailable event handlers consume fewer resources than available event handlers.

27. A method for interprocess communication comprising:
  defining an event indicative of a reportable occurrence in the information retrieval environment, the event corresponding to a common class associated with a plurality of events, the plurality of events associated with a genericizing reference, the genericizing reference inclusive of the plurality of events and each of the events associated with an event specific class having event data indicative of event specific parameters, each of the events defined independently of an underlying delivery infrastructure;

subscribing, from a local subscriber, to the event for requesting reporting of the event, subscribing further including specifying an event handler operable to process the event, the local subscriber issuing the received event subscription becoming disabled following the subscription until an occurrence and subsequent publication of the event;

registering an indication of the subscription in a local map providing a local mapping operative for associating events and event handlers in a local process for invoking the event handler responsively to an occurrence of the defined event;

registering an indication of the subscription in a global map providing a persistent mapping operative for associating events with event handlers, and further operable to invoke event handlers in remote servers;

receiving a publication of the event from a monitoring component;

dispatching an indication of the publication to local subscribers;

propagating an indication of the publication to the global event service; and invoking a module including the specified event handlers in response to the dispatching and propagating the indication of event publication, invoking including indexing, in the persistent mapping via the event identity, a persistent reference to the modules including the event handlers associated with the event, the persistent reference operable to identify a handler independently of enablement of the module containing the associated event handler, enabling modules corresponding to activation of a corresponding component by an activation mechanism;

disabling corresponding to deactivation of the corresponding component by the activation mechanism, the activation and deactivation operations operable to reduce memory consumption by inactive components and provide selective invocation to maintain availability of the component, the event data including event variables generated and passed by the publisher of the event and subscriber instantiated variables generated by the state information of the subscriber;

selectively enabling, if the module including the corresponding event handler is disabled, the module for enabling the event handler for receipt and subsequent processing of the published event; and invoking the module including the corresponding event handler via the mapping.

28. An information processing device for processing events in a managed information system comprising:

an interface for defining a plurality of events, the plurality of events associated with a genericizing reference, the genericizing reference inclusive of the plurality of events and each of the events associated with an event specific class having event data indicative of event specific parameters, each of the events defined independently of an underlying delivery infrastructure;

a processor operable to perform a set of instructions according to a predetermined sequence;

a memory operable to store the instructions and corresponding data items;

an interface operable to transmit and receive, based on the instructions, commands and data to other information processing devices in the managed information system;

an event service operable to receive an event subscription containing an event identity for an event, the event corresponding to reportable occurrences in the managed information system;

an event map operable to associate the event identity with an event handler responsive to the event by creating a mapping of the event identity to the event handler;

a subscriber having an event handler operable to receive a publication of the event, the event service further operable to traverse, in response to the publication of the event, the mapping of the event identity to an indication of the corresponding associated event handler, the traversing operable to enable the module including the handler if the module is disabled at the time of publishing the event, traversing further including:

identifying the event in a persistent event mapping, the persistent event mapping indicative of modules containing event handlers associated with the event; and dispatching, in the identified modules, the associated event handlers, dispatching comprising:

selectively receiving an enablement indication in response to traversing in the persistent event mapping;

identifying, in a local event mapping for the enabled module, subscriber entities including handlers associated with the mapped event;

invoking the module including the corresponding event handler via the mapping and invoking, in the mapped module, the identified subscribers including associated handlers, the event data including event variables generated and passed by the publisher of the event and subscriber instantiated variables generated by the state information of the subscriber; and an activation manager operable to determine if a particular module including the corresponding event handler is enabled, and further operable to selectively enable, if the module including the corresponding event handler is disabled, the module for enabling the event handler for receipt and subsequent processing of the published event.

29. The method of claim 28 wherein the event service further includes:

a component event service operable to identify, using the associated event identity, the particular handler corresponding to the subscribed event in the enabled module including the handler; and a local event map in the component event service operable for invoking, using the state of the enabled module, the event handler.

30. The method of claim 28 wherein the event service further includes a global event service, the global event service operable to:

receive the event publication according to a genericizing reference; and identify an event specific class corresponding to the event, the event specific class transparent to the mapping via the genericizing reference and operative to distinguish the received events from other events.

31. The method of claim 28 wherein the event service is further operable to, following selective enabling of the module containing the corresponding handler:

determine the mapping of the enabled module and corresponding event handler.

32. The method of claim 28 wherein the event service further comprises:
a persistent event map operable to identify the published event, the persistent event mapping indicative of modules containing event handlers associated with the event; and
a local event map operable to dispatch, in the identified modules, the associated event handlers.

33. The method of claim 32 further comprises:
a module containing the event handler, the module operable to selectively receive an enablement indication in response to traversing in the persistent event mapping, the module further including the local event map indicative of subscriber entities including handlers associated with the mapped event, the module operable to invoke, via the local event map, the identified subscribers including associated handlers.

34. The method of claim 32 wherein the persistent map of the event is operable to maintain the event independently of individual modules referencing the event, the independent maintenance operable to avoid copy constructors of the event for enabling successive references to the same event.

35. The method of claim 28 further comprising a plurality of events, the plurality of events associated with a genericizing reference, the genericizing reference inclusive of the plurality of events and each of the events associated with an event specific class having event data indicative of event specific parameters.

36. The method of claim 35 wherein the event data includes event variables generated and passed by the publisher of the event and subscriber instantiated variables generated by the state information of the subscriber.

37. The method of claim 32 wherein traversing further comprises indexing, in the persistent mapping via the event identity, a persistent reference to the modules including the event handlers associated with the event, the persistent reference operable to identify a handler independently of enablement of the module containing the associated event handler.

38. The method of claim 28 wherein the event service further includes:
a component event service operable to generate the local mapping entry in the component event map having a reference to the subscriber entity including the corresponding event handler, and
a persistent event map operable to store a persistent mapping entry corresponding to the module including the corresponding event handler, the persistent mapping entry operable to trigger selective enablement of the handling component by a plurality of subscribing entities, the persistent event map further operable to identify at least one of the persistent mapping entries corresponding to the published event, each of the mapping entries indicative of a module;
a local event map operable to a plurality of subscribers including the corresponding event handlers in the identified modules associated with the event.

39. The method of claim 28 further comprising a thread manager, wherein each of the modules is operable to include a plurality of threads, and wherein the thread manager is operable to perform graceful termination each of the threads prior to deactivation, deactivation occurring by informing each of the threads of the termination and computing when each thread has attained a termination point.

40. The method of claim 28 wherein the association between the event identity and the corresponding event handler further comprises:
a local mapping in a local event map identifying a subscribing entity including an event handler corresponding to the event identity, and
a persistent event mapping in a shared memory portion identifying the module including the event handler corresponding to the event identity.

41. The method of claim 40 further comprising a strategizing allocator operable to selectively generate the persistent event mapping if the associating of the event identity occurs in a single module.

42. A computer program product having a computer readable storage medium operable to store computer program logic embodied in computer program code as a set of computer instructions encoded thereon for performing a method of processing events in a managed information system, the method comprising:
defining a plurality of events, the plurality of events associated with a genericizing reference, the genericizing reference inclusive of the plurality of events and each of the events associated with an event specific class having event data indicative of event specific parameters, each of the events defined independently of an underlying delivery infrastructure;
receiving an event subscription containing an event identity for an event, the event corresponding to reportable occurrences in the managed information system;
associating the event identity with an event handler responsive to the event by creating a mapping of the event identity to the event handler;
receiving a publication of the event; and
traversing, in response to the publication, the mapping of the event identity to an indication of the corresponding associated handler, the traversing operable to enable the module including the event handler if the module is disabled at the time of publishing the event, enabling modules corresponding to activation of a corresponding component by an activation mechanism, and disabling corresponding to deactivation of the corresponding component by the activation mechanism, the activation and deactivation operations operable to reduce memory consumption by inactive components and provide selective invocation to maintain availability of the component, the enabling and disabling performed at a level of granularity of the modules, each of the modules corresponding to a component and operable be enabled and disabled by activation and deactivation of the corresponding component,
the event data including event variables generated and passed by the publisher of the event and subscriber instantiated variables generated by the state information of the subscriber;
selectively enabling, if the module including the corresponding event handler is disabled, the module for enabling the event handler for receipt and subsequent processing of the published event; and
invoking the module including the corresponding event handler via the mapping.

43. An information processing device having a processor for processing events in a managed information system comprising:
means for defining a plurality of events, the plurality of events associated with a genericizing reference, the genericizing reference inclusive of the plurality of events and each of the events associated with an event specific class having event data indicative of event specific parameters, each of the events defined independently of an underlying delivery infrastructure;

means for receiving an event subscription containing an event identity for an event, the event corresponding to reportable occurrences in the managed information system;

means for associating the event identity with an event handler responsive to the event by creating a mapping of the event identity to the event handler, the association between the event identity and the corresponding event handler further comprising:

a local mapping in a local event map identifying a subscribing entity including an event handler corresponding to the event identity, and a persistent event mapping in a shared memory portion identifying the module including the event handler corresponding to the event identity;

means for receiving a publication of the event;

means for traversing, in response to the publication, the mapping of the event identity to an indication of the corresponding associated handler, the traversing operable to enable the module including the event handler if the module is disabled at the time of publishing the event, the means for traversing further including:

means for identifying the event in a persistent event mapping, the persistent event mapping indicative of modules containing event handlers associated with the event; and means for dispatching, in the identified modules, the associated event handlers, dispatching comprising:

means for selectively receiving an enablement indication in response to traversing in the persistent event mapping;

means for identifying, in a local event mapping for the enabled module, subscriber entities including handlers associated with the mapped event;

means for invoking the module including the corresponding event handler via the mapping; and means for invoking, in the mapped module, the identified subscribers including associated handlers, the event data including event variables generated and passed by the publisher of the event and subscriber instantiated variables generated by the state information of the subscriber; and means for selectively enabling, if the module including the corresponding event handler is disabled, the module for enabling the event handler for receipt and subsequent processing of the published event.

44. The method of claim 1 wherein activating further comprises:

loading a module, the module containing the instructions defining the component, from a nonexecutable memory area to an executable memory area for execution of the instructions; and deactivating further comprises unlinking the loaded module by disassociating the loaded module from the executable memory area.

45. The method of claim 44 wherein the loaded modules are sequences of instructions defining at least one thread, all of the threads collectively activated and deactivated via the component defined by the module.

46. The method of claim 45 wherein selective activation further comprises:

detecting, from a loaded component defined by a detecting software entity, occurrence of an instance corresponding to an event handler; and invoking the event handler, the event handler in the invoked module, by activating the component including the event handler.

* * * * *